(12) United States Patent
Hill et al.

(10) Patent No.: US 12,066,561 B2
(45) Date of Patent: Aug. 20, 2024

(54) POSITION TRACKING SYSTEM AND METHOD USING RADIO SIGNALS AND INERTIAL SENSING

(71) Applicant: Position Imaging, Inc., Portsmouth, NH (US)

(72) Inventors: Edward L. Hill, Conway, NH (US); Mark Schneider, Williston, VT (US)

(73) Assignee: Position Imaging, Inc., Portsmouth, NH (US)

( * ) Notice: Subject to any disclaimer, the term of this patent is extended or adjusted under 35 U.S.C. 154(b) by 34 days.

(21) Appl. No.: 17/509,392

(22) Filed: Oct. 25, 2021

(65) Prior Publication Data

US 2022/0043102 A1  Feb. 10, 2022

Related U.S. Application Data

(63) Continuation of application No. 16/571,622, filed on Sep. 16, 2019, now Pat. No. 11,175,375, which is a continuation-in-part of application No. 15/685,493, filed on Aug. 24, 2017, now Pat. No. 10,416,276, which is a continuation-in-part of application No. 14/600,025, filed on Jan. 20, 2015, now abandoned, (Continued)

(51) Int. Cl.
*G01S 5/02* (2010.01)

(52) U.S. Cl.
CPC .......... *G01S 5/0263* (2013.01); *G01S 5/0264* (2020.05); *G01S 5/0257* (2013.01); *G01S 5/02585* (2020.05); *G01S 5/0294* (2013.01)

(58) Field of Classification Search
CPC .... G01S 5/0257; G01S 5/0258; G01S 5/0285; G01S 5/0263; G01S 5/0264; G01S 5/0294; G01S 19/45; G01S 19/47; G01S 19/48; G01S 19/42
USPC ............... 342/357.28, 357.3, 357.31, 357.32
See application file for complete search history.

(56) References Cited

U.S. PATENT DOCUMENTS 2,408,122 A  9/1946  Wirkler
3,824,596 A  7/1974  Guion et al.
(Continued)

FOREIGN PATENT DOCUMENTS

CN  113447028 A  *  9/2021  ............. G01C 21/20
JP  2004518136 A  *  6/2004  ............... G01S 5/14
(Continued)

OTHER PUBLICATIONS

Bo, et al., "SmartLoc: Sensing Landmarks Silently for Smartphone Based Metropolitan Localization", Arxiv.org, arXiv:1310.8187v1 [cs.NI], Aug. 31, 2013.
(Continued)

*Primary Examiner* — Chuong P Nguyen
(74) *Attorney, Agent, or Firm* — Schmeiser, Olsen & Watts LLP

(57) ABSTRACT

An RF position tracking system for wirelessly tracking the three-dimensional position of a tracked object. The tracked object has at least one mobile antenna and at least one inertial sensor. The system uses a plurality of base antennas which communicate with the mobile antenna using radio signals. The tracked object also incorporates the inertial sensor to improve position stability by allowing the system to compare position data from radio signals to data provided by the inertial sensor.

18 Claims, 11 Drawing Sheets

Related U.S. Application Data which is a continuation of application No. 13/293,639, filed on Nov. 10, 2011, now Pat. No. 8,957,812.

(60) Provisional application No. 61/413,026, filed on Nov. 12, 2010.

(56) References Cited

U.S. PATENT DOCUMENTS

| | | |
|---|---|---|
| 3,940,700 A | 2/1976 | Fischer |
| 4,328,499 A | 5/1982 | Anderson et al. |
| 5,010,343 A | 4/1991 | Andersson |
| 5,343,212 A | 8/1994 | Rose et al. |
| 5,426,438 A | 6/1995 | Peavey et al. |
| 5,510,800 A | 4/1996 | McEwan |
| 5,574,468 A | 11/1996 | Rose |
| 5,592,180 A | 1/1997 | Yokev et al. |
| 5,600,330 A | 2/1997 | Blood |
| 5,657,026 A | 8/1997 | Culpepper et al. |
| 5,923,286 A | 7/1999 | Divakaruni |
| 5,953,683 A | 9/1999 | Hansen et al. |
| 6,088,653 A | 7/2000 | Sheikh et al. |
| 6,101,178 A | 8/2000 | Beal |
| 6,167,347 A | 12/2000 | Lin |
| 6,255,991 B1 | 7/2001 | Hedin |
| 6,292,750 B1 | 9/2001 | Lin |
| 6,409,687 B1 | 6/2002 | Foxlin |
| 6,412,748 B1 | 7/2002 | Girard |
| 6,417,802 B1 | 7/2002 | Diesel |
| 6,496,778 B1 | 12/2002 | Lin |
| 6,512,748 B1 | 1/2003 | Mizuki et al. |
| 6,593,885 B2 | 7/2003 | Wisherd et al. |
| 6,630,904 B2 | 10/2003 | Gustafson et al. |
| 6,683,568 B1 | 1/2004 | James et al. |
| 6,697,736 B2 | 2/2004 | Lin |
| 6,720,920 B2 | 4/2004 | Breed et al. |
| 6,721,657 B2 | 4/2004 | Ford et al. |
| 6,744,436 B1 | 6/2004 | Chirieleison, Jr. et al. |
| 6,750,816 B1 | 6/2004 | Kunysz |
| 6,861,982 B2 | 3/2005 | Forstrom et al. |
| 6,867,774 B1 | 3/2005 | Halmshaw et al. |
| 6,989,789 B2 | 1/2006 | Ferreol et al. |
| 7,009,561 B2 | 3/2006 | Menache et al. |
| 7,143,004 B2 | 11/2006 | Townsend et al. |
| 7,168,618 B2 | 1/2007 | Schwartz |
| 7,190,309 B2 | 3/2007 | Hill |
| 7,193,559 B2 | 3/2007 | Ford et al. |
| 7,236,091 B2 * | 6/2007 | Kiang .................... G06Q 10/08 340/8.1 |
| 7,236,092 B1 | 6/2007 | Joy |
| 7,248,964 B2 * | 7/2007 | Bye ........................ G01S 19/47 701/534 |
| 7,274,504 B2 * | 9/2007 | Crane ..................... G01S 19/26 342/357.65 |
| 7,292,189 B2 | 11/2007 | Orr et al. |
| 7,295,925 B2 | 11/2007 | Breed et al. |
| 7,315,281 B2 | 1/2008 | Dejanovic et al. |
| 7,336,078 B1 | 2/2008 | Merewether et al. |
| 7,346,452 B2 * | 3/2008 | Ford ....................... G01S 19/49 701/472 |
| 7,409,290 B2 | 8/2008 | Lin |
| 7,443,342 B2 | 10/2008 | Shirai et al. |
| 7,499,711 B2 | 3/2009 | Hoctor et al. |
| 7,533,569 B2 | 5/2009 | Sheynblat |
| 7,538,724 B1 | 5/2009 | Baillot |
| 7,612,715 B2 | 11/2009 | Macleod |
| 7,646,330 B2 | 1/2010 | Karr |
| 7,868,760 B2 | 1/2011 | Smith et al. |
| 7,876,268 B2 | 1/2011 | Jacobs |
| 7,933,730 B2 | 4/2011 | Li et al. |
| 8,269,624 B2 * | 9/2012 | Chen ...................... G01S 5/0027 701/484 |
| 8,269,654 B2 | 9/2012 | Jones |
| 8,364,401 B2 * | 1/2013 | Da Silva ................ G01S 19/47 701/472 |
| 8,406,470 B2 | 3/2013 | Jones et al. |
| 8,457,655 B2 | 6/2013 | Zhang et al. |
| 8,749,433 B2 | 6/2014 | Hill |
| 8,860,611 B1 | 10/2014 | Anderson et al. |
| 8,957,812 B1 | 2/2015 | Hill et al. |
| 9,063,215 B2 | 6/2015 | Perthold et al. |
| 9,092,898 B1 | 7/2015 | Fraccaroli et al. |
| 9,120,621 B1 | 9/2015 | Curlander et al. |
| 9,141,194 B1 | 9/2015 | Keyes et al. |
| 9,174,746 B1 | 11/2015 | Bell et al. |
| 9,482,741 B1 | 11/2016 | Min et al. |
| 9,497,728 B2 | 11/2016 | Hill |
| 9,519,344 B1 | 12/2016 | Hill |
| 9,544,552 B2 | 1/2017 | Takahashi |
| 9,782,669 B1 | 10/2017 | Hill |
| 9,872,151 B1 | 1/2018 | Puzanov et al. |
| 9,927,530 B2 * | 3/2018 | Boyarski ................ G01S 19/47 |
| 9,933,509 B2 | 4/2018 | Hill et al. |
| 9,961,503 B2 | 5/2018 | Hill |
| 10,001,833 B2 | 6/2018 | Hill |
| 10,082,584 B2 * | 9/2018 | Hoang .................... G01S 5/0264 |
| 10,163,149 B1 | 12/2018 | Famularo et al. |
| 10,180,490 B1 | 1/2019 | Schneider et al. |
| 10,257,654 B2 | 4/2019 | Hill |
| 10,416,276 B2 * | 9/2019 | Hill ........................ G01S 5/0063 |
| 10,444,323 B2 | 10/2019 | Min et al. |
| 10,455,364 B2 | 10/2019 | Hill |
| 10,921,460 B2 * | 2/2021 | Kang ...................... G01S 19/47 |
| 11,175,375 B2 * | 11/2021 | Hill ....................... G01S 5/02585 |
| 11,327,181 B2 * | 5/2022 | Rezaei .................... G01S 19/47 |
| 11,789,163 B2 * | 10/2023 | Dong ...................... G01S 19/393 342/357.3 |
| 2002/0021277 A1 | 2/2002 | Kramer et al. |
| 2002/0140745 A1 | 10/2002 | Ellenby et al. |
| 2002/0177476 A1 | 11/2002 | Chou |
| 2003/0053492 A1 | 3/2003 | Matsunaga |
| 2003/0120425 A1 | 6/2003 | Stanley et al. |
| 2003/0135327 A1 * | 7/2003 | Levine .................... G01S 19/49 342/357.65 |
| 2003/0176196 A1 | 9/2003 | Hall et al. |
| 2003/0195017 A1 | 10/2003 | Chen et al. |
| 2004/0095907 A1 | 5/2004 | Agee et al. |
| 2004/0107072 A1 | 6/2004 | Dietrich et al. |
| 2004/0176102 A1 | 9/2004 | Lawrence et al. |
| 2004/0203846 A1 | 10/2004 | Caronni et al. |
| 2005/0001712 A1 | 1/2005 | Yarbrough |
| 2005/0057647 A1 | 3/2005 | Nowak |
| 2005/0125141 A1 * | 6/2005 | Bye ........................ G01S 19/47 701/469 |
| 2005/0143916 A1 | 6/2005 | Kim et al. |
| 2005/0184907 A1 | 8/2005 | Hall et al. |
| 2005/0275626 A1 | 12/2005 | Mueller et al. |
| 2006/0013070 A1 | 1/2006 | Holm et al. |
| 2006/0022800 A1 | 2/2006 | Krishna et al. |
| 2006/0061469 A1 | 3/2006 | Jaeger et al. |
| 2006/0066485 A1 | 3/2006 | Min |
| 2006/0101497 A1 | 5/2006 | Hirt et al. |
| 2006/0192709 A1 | 8/2006 | Schantz et al. |
| 2006/0279459 A1 | 12/2006 | Akiyama et al. |
| 2006/0290508 A1 | 12/2006 | Moutchkaev et al. |
| 2007/0060384 A1 | 3/2007 | Dohta |
| 2007/0138270 A1 | 6/2007 | Reblin |
| 2007/0205867 A1 | 9/2007 | Kennedy et al. |
| 2007/0210920 A1 | 9/2007 | Panotopoulos |
| 2007/0222560 A1 | 9/2007 | Posamentier |
| 2008/0007398 A1 | 1/2008 | DeRose et al. |
| 2008/0048913 A1 | 2/2008 | Macias et al. |
| 2008/0091350 A1 | 4/2008 | Smith et al. |
| 2008/0143482 A1 | 6/2008 | Shoarinejad et al. |
| 2008/0150678 A1 | 6/2008 | Giobbi et al. |
| 2008/0154691 A1 | 6/2008 | Wellman et al. |
| 2008/0174485 A1 | 7/2008 | Carani et al. |
| 2008/0204322 A1 | 8/2008 | Oswald et al. |
| 2008/0266253 A1 | 10/2008 | Seeman et al. |
| 2008/0281618 A1 | 11/2008 | Mermet et al. |
| 2008/0316324 A1 | 12/2008 | Rofougaran et al. |
| 2009/0043504 A1 | 2/2009 | Bandyopadhyay et al. |
| 2009/0149202 A1 | 6/2009 | Hill et al. |
| 2009/0224040 A1 | 9/2009 | Kushida et al. |

(56) References Cited

U.S. PATENT DOCUMENTS

| | | |
|---|---|---|
| 2009/0243932 A1 | 10/2009 | Moshfeghi |
| 2009/0323586 A1 | 12/2009 | Hohl et al. |
| 2010/0090852 A1 | 4/2010 | Eitan et al. |
| 2010/0097208 A1 | 4/2010 | Rosing et al. |
| 2010/0103173 A1 | 4/2010 | Lee et al. |
| 2010/0103989 A1 | 4/2010 | Smith et al. |
| 2010/0123664 A1 | 5/2010 | Shin et al. |
| 2010/0159958 A1 | 6/2010 | Naguib et al. |
| 2011/0006774 A1 | 1/2011 | Baiden |
| 2011/0037573 A1 | 2/2011 | Choi |
| 2011/0184593 A1* | 7/2011 | Swope .................. G05D 1/106 701/4 |
| 2011/0187600 A1 | 8/2011 | Landt |
| 2011/0208481 A1 | 8/2011 | Slastion |
| 2011/0210843 A1 | 9/2011 | Kummetz |
| 2011/0241942 A1 | 10/2011 | Hill |
| 2011/0256882 A1 | 10/2011 | Markhovsky et al. |
| 2011/0264520 A1 | 10/2011 | Puhakka |
| 2012/0013509 A1 | 1/2012 | Wisherd et al. |
| 2012/0127088 A1 | 5/2012 | Pance et al. |
| 2012/0176227 A1 | 7/2012 | Nikitin |
| 2012/0184285 A1 | 7/2012 | Sampath et al. |
| 2012/0286933 A1 | 11/2012 | Hsiao |
| 2012/0319822 A1 | 12/2012 | Hansen |
| 2013/0018582 A1 | 1/2013 | Miller et al. |
| 2013/0021417 A1 | 1/2013 | Ota et al. |
| 2013/0029685 A1 | 1/2013 | Moshfeghi |
| 2013/0036043 A1 | 2/2013 | Faith |
| 2013/0113993 A1 | 5/2013 | Dagit, III |
| 2013/0281084 A1 | 10/2013 | Batada et al. |
| 2013/0314210 A1 | 11/2013 | Schoner et al. |
| 2014/0022058 A1 | 1/2014 | Striemer et al. |
| 2014/0253368 A1 | 9/2014 | Holder |
| 2014/0300516 A1 | 10/2014 | Min et al. |
| 2014/0361078 A1 | 12/2014 | Davidson |
| 2015/0009949 A1 | 1/2015 | Khoryaev et al. |
| 2015/0039458 A1 | 2/2015 | Reid |
| 2015/0091757 A1 | 4/2015 | Shaw et al. |
| 2015/0130664 A1 | 5/2015 | Hill et al. |
| 2015/0133162 A1 | 5/2015 | Meredith et al. |
| 2015/0134418 A1 | 5/2015 | Leow et al. |
| 2015/0169916 A1 | 6/2015 | Hill et al. |
| 2015/0221135 A1 | 8/2015 | Hill et al. |
| 2015/0323643 A1 | 11/2015 | Hill et al. |
| 2015/0362581 A1 | 12/2015 | Friedman et al. |
| 2015/0379366 A1 | 12/2015 | Nomura et al. |
| 2016/0035078 A1 | 2/2016 | Lin et al. |
| 2016/0142868 A1 | 5/2016 | Kulkarni et al. |
| 2016/0150196 A1 | 5/2016 | Horvath |
| 2016/0156409 A1 | 6/2016 | Chang |
| 2016/0178727 A1 | 6/2016 | Bottazzi |
| 2016/0238692 A1 | 8/2016 | Hill et al. |
| 2016/0256100 A1 | 9/2016 | Jacofsky et al. |
| 2016/0286508 A1 | 9/2016 | Khoryaev et al. |
| 2016/0366561 A1 | 12/2016 | Min et al. |
| 2016/0370453 A1 | 12/2016 | Boker et al. |
| 2016/0371574 A1 | 12/2016 | Nguyen et al. |
| 2017/0030997 A1 | 2/2017 | Hill et al. |
| 2017/0031432 A1 | 2/2017 | Hill |
| 2017/0123426 A1 | 5/2017 | Hill et al. |
| 2017/0234979 A1 | 8/2017 | Mathews et al. |
| 2017/0261592 A1 | 9/2017 | Min et al. |
| 2017/0280281 A1 | 9/2017 | Pandey et al. |
| 2017/0323174 A1 | 11/2017 | Joshi et al. |
| 2017/0350961 A1 | 12/2017 | Hill et al. |
| 2017/0372524 A1 | 12/2017 | Hill |
| 2018/0068266 A1 | 3/2018 | Kirmani et al. |
| 2018/0164103 A1 | 6/2018 | Hill |
| 2018/0188381 A1* | 7/2018 | Zhang .................. H04W 4/021 |
| 2018/0197139 A1 | 7/2018 | Hill |
| 2018/0231649 A1 | 8/2018 | Min et al. |
| 2018/0242111 A1 | 8/2018 | Hill |
| 2019/0090744 A1 | 3/2019 | Mahfouz |
| 2019/0295290 A1 | 9/2019 | Schena et al. |

FOREIGN PATENT DOCUMENTS

| | | |
|---|---|---|
| WO | 2001006401 A1 | 1/2001 |
| WO | 2005010550 A1 | 2/2005 |

OTHER PUBLICATIONS

Alban, Santago "Design and Performance of a Robust GPS/INS Attitude System for Automobile Applications", Dissertation, Stanford University, Jun. 2004; 218 pages.

Farrell and Barth, "The Global Positioning System & Interial Navigation", 1999, McGraw-Hill; pp. 245-252.

Farrell, et al. "Real-Time Differential Carrier Phase GPS-Aided INS", Jul. 2000, IEEE Transactions on Control Systems Technology, vol. 8, No. 4; 13 pages.

Filho, et al. "Integrated GPS/INS Navigation System Based on a Gyroscope-Free IMU", DINCON Brazilian Conference on Synamics, Control, and Their Applications, May 22-26, 2006; 6 pages.

Gao, Jianchen "Development of a Precise GPS/INS/On-Board Vehicle Sensors Integrated Vehicular Positioning System", Jun. 2007, UCGE Reports No. 20555; 245 pages.

Gautier, Jennifer Denise "GPS/INS Generalized Evaluation Tool (GIGET) for the Design and Testing of Integrated Navigation Systems", Dissertation, Stanford University, Jun. 2003; 160 pages.

Goodall, Christopher L. , "Improving Usability of Low-Cost INS/GPS Navigation Systems using Intelligent Techniques", Jan. 2009, UCGE Reports No. 20276; 234 pages.

Grewel and Andrews "Global Positioning Systems, Inertial Navigation, and Integration" Section 8.6-8.6.3.1, 2001, John Weiley and Sons, pp. 252-256.

Pourhomayoun, Mohammad and Mark Fowler "Improving WLAN-based Indoor Mobile Positioning Using Sparsity," Conference Record of the Forty Sixth Asilomar Conference on Signals, Systems and Computers, Nov. 4-7, 2012, pp. 1393-1396, Pacific Grove, California.

Proakis, John G. and Masoud Salehi, "Communication Systems Engineering", Second Edition, Prentice-Hall, Inc., Upper Saddle River, New Jersey, 2002; 815 pages.

Schmidt and Phillips, "INS/GPS Integration Architectures", NATO RTO Lecture Seriers, First Presented Oct. 20-21, 2003; 24 pages.

Schumacher, Adrian "Integration of a GPS aided Strapdown Inertial Navigation System for Land Vehicles", Master of Science Thesis, KTH Electrical Engineering, 2006; 67 pages.

Sun, Debo "Ultra-Tight GPS/Reduced IMU for Land Vehicle Navigation", Mar. 2010, UCGE Reports No. 20305; 254 pages.

Sun, et al., "Analysis of the Kalman Filter With Different INS Error Models for GPSINS Integration in Aerial Remote Sensing Applications", Bejing, 2008, The International Archives of the Photogrammerty, Remote Sensing and Spatial Information Sciences vol. XXXVII, Part B5.; 8 pages.

Vikas Numar N. "Integration of Inertial Navigation System and Global Positioning System Using Kalman Filtering", M.Tech Dissertation, Indian Institute of Technology, Bombay, Mumbai, Jul. 2004; 69 pages.

Welch, Greg and Gary Bishop "An Introduction to the Kalman Filter, TR95-041," Department of Computer Science, University of North Carolina at Chapel Hill, Chapel Hill, NC 27599-3175, Updated: Monday, Jul. 24, 2006.

Yang, Yong "Tightly Coupled Mems INS/GPS Integration with INS Aided Receiver Tracking Loops", Jun. 2008, JCGE Reports No. 20270; 205 pages.

Wilde, Andreas, "Extended Tracking Range Delay-Locked Loop," Proceedings IEEE International Conference on Communications, Jun. 1995, pp. 1051-1054.

"ADXL202/ADXL210 Product Sheet", Analog Devices, Inc., Analog. com, 1999.

Morbella N50: 5-inch GPS Navigator User's Manual, Maka Technologies Group, May 2012.

Bachmann, Eric Robert "Intertial and magnetic tracking of limb segment into orientation for inserting humans into synthetic enviomments," Dissertation, Dec. 2000, Naval Postgraduate School, Montery, CA; http://www.nps.edu/library.

(56) References Cited

OTHER PUBLICATIONS

Brown, Robert Grover and Patrick Y.C. Hwang, "Introduction to Random Signals and Applied Kalman Filtering," Fourth Edition, 2012, John Wiley and Sons, Inc., Hoboken, NJ.

Foxlin, Eric "Intertial Head-Tracker Sensor Fusion by a Complementary Separate-Bias Kalman Filter," IEEE, 1996, Proceedings of VRAIS, pp. 185-195.

Salhuana, Laura "Setting up the MMZ7660FC to do Orientation Detection," 2009, Freescale Semiconductor, Inc.

Luinge, H.J. "Inertial Sensing of Human Movement," Thesis, 2002, Twente University, the Netherlands.

Dictionary Definition for Peripheral Equipment. (2001). Hargrave's Communications Dictionary, Wiley. Hoboken, NJ: Wiley. Retrieved from Https://search.credorefernce.com/content/entry/hargravecomms/peripheral_equioment/0 (Year:2001).

Huyghe, et al. "3D orientation tracking based on unscented Kalman filtering of accelerometer and magnetometer data," Mar. 2009, IEEE Explore, Research Gate; 5 pages.

Keir, et al., "Accelerometer-based Orientation Sensing for Head Tracking in AR & Robots," 2007, UC Research Repository, Engineering: Conference Contributions, https://ir.canterbury.ac.nz/bitstream/handle/10092/1623/12606246_icst_2007%20-%20Head%20Tracking%20-%20FINAL.pdf?sequence=1&isAllowed=y.

Keir, Matthew Stuart "Robust Dynamic Orientation Sensing Using Accelerometers: Model-based Methods for Head Tracking in AR," Thesis, Sep. 24, 2008, University of Canterbury, New Zealand.

Marins, et al. "An Extended Kalman Filter for Quaternion-Based Orientation Estimation Using MARG Sensors," Proceedings of the 2001 IEEE/RSJ International Conference on Intelligent Robots and Systems, Hawaii, Oct. 29-Nov. 3, 2001, pp. 2003-2011.

Mizell, David "Using Gravity to Estimate Accelerometer Orientation," Proceedings of the Seventh IEEE International Symposium on Wearable Computers, 2003.

Tan, Chin-Woo and Sungsu Park, "Design and Error Analysis of Accelerometer-Based Inertial Navigation Systems," Jun. 2002, California PATH Program, Institute of Transportation Studies, University of California, Berkeley.

Roetenberg, et al. "Inertial and magnetic sensing of human movement near ferromagnetic materials," 2003, Proceedings of the Second IEEE and ACM International Symposium on Mixed and Augmented Reality.

Restriction Requirement in U.S. Appl. No. 13/293,639 mailed on Jan. 28, 2014; 5 pages.

Non-Final Office Action in U.S. Appl. No. 13/293,639 mailed on Jun. 18, 2014; 7 pages.

Notice of Allowance in U.S. Appl. No. 13/293,639 mailed on Oct. 14, 2014; 5 pages.

Non-Final Office Action in U.S. Appl. No. 14/600,025 mailed on Feb. 28, 2017; 21 pages.

Notice of Allowance in U.S. Appl. No. 15/685,493 mailed on Jul. 3, 2019; 7 pages.

Non-Final Office Action in U.S. Appl. No. 16/571,622 mailed on Jul. 22, 2020.

Non-Final Office Action in U.S. Appl. No. 16/571,622 mailed on Jan. 28, 2021.

Notice of Allowance in U.S. Appl. No. 16/571,622 mailed on Jul. 1, 2021.

* cited by examiner

POSITION TRACKING SYSTEM AND METHOD USING RADIO SIGNALS AND INERTIAL SENSING

RELATED APPLICATIONS

This application is a continuation of U.S. application Ser. No. 16/571,622, filed Sep. 16, 2019 titled "Position Tracking System and Methods Using Radio Signals and Inertial Sensing", which is a continuation-in-part of U.S. application Ser. No. 15/685,493, filed Aug. 24, 2017, titled "Position Tracking System and Methods Using Radio Signals and Inertial Sensing", now U.S. Pat. No. 10,416,276, which is a continuation-in-part of U.S. application Ser. No. 14/600,025, filed Jan. 20, 2015, titled "Position Tracking System and Methods Using Radio Signals and Inertial Sensing", which is a continuation of U.S. application Ser. No. 13/293,639, filed Nov. 10, 2011, titled "Position Tracking System and Methods Using Radio Signals and Inertial Sensing", now U.S. Pat. No. 8,957,812, which claims the benefit of and priority to U.S. provisional application No. 61/413,026, filed on Nov. 12, 2010, titled "Position Tracking System and Methods Using Radio Signals and Inertial Sensing," the entireties of which applications are incorporated by reference herein.

FIELD OF THE INVENTION

The present disclosure relates generally to position tracking of mobile devices. More particularly, the present disclosure relates to a position tracking system and method using radio signals and inertial sensing.

BACKGROUND

In a Global Positioning System (GPS), satellites orbiting the earth transmit signals to passive receivers on the ground. The receivers only receive signals, but they do not transmit signals. One limitation of GPS receivers is that they require an unobstructed view of the sky. As a result, GPS receivers typically are better suited for outdoor use and in areas away from tall buildings or heavy tree cover. A further limitation of GPS location devices is their dependence on an accurate external time reference.

In a GPS system, each of many GPS satellite transmits a signal that includes data to indicate the satellite's location and current time. GPS systems use two carrier frequencies (L1 and L2) for transmitting information, including satellite location, ionospheric propagation delays, offsets between satellite clock time and true GPS time. Additionally, GPS measurements are determined from pseudoranges, which are range measurements biased by receiver and satellite clock errors. The GPS satellites are all synchronized to transmit repeating signals at the same time. Because each satellite is located at a different distance from a receiver on the ground, transmitted signals arrive at the GPS receiver at slightly different times. The receiver uses the different receipt times for various signals to calculate the receiver's location in three dimensions.

U.S. Pat. Nos. 5,953,683; 7,143,004; and 7,533,569 describe sourceless orientation sensors. For example, U.S. Pat. No. 7,533,569 discloses a method of measuring positional changes of an object by using multiple accelerometers. U.S. Pat. No. 7,236,091 describes a hybrid RF/inertial position tracking system having a "wide resolution" mode for general position tracking, and a "high-resolution" mode that employs kinematic models. In this system, the high-resolution position accuracy is considered to be within the order of meters. U.S. Pat. Nos. 7,409,290; 6,167,347; 6,292,750; 6,417,802; 6,496,778; 5,923,286; 6,630,904; 6,721,657; 7,193,559; and 6,697,736 describe GPS-aided positioning and navigation methods. For example, U.S. Pat. No. 7,409,290 altitude and heading information are used to aid the GPS positioning when satellite signals are not available.

Unlike GPS, where transmission time is measured from a satellite to a mobile device or receiver, high-accuracy systems that track mobile devices in three-dimensional space measure the time that a signal arrives from the mobile device to a system's connected (either wired or wireless) antennae. These systems do not have the bias errors that GPS has. These time-based, high-accuracy RF positioning systems that use networked antennae for comparing signal time of arrival or difference of arrival measurements consist of receiver hardware having multiple receiver antennae and transmitter hardware having one or more transmitter antennae. To track a single transmitter or transmitter antenna in three dimensions, at least four receiver antennae are required. Similarly, for tracking in two dimensions, at least three receiver antennae are required.

Also, unlike GPS, where the tracking calculation is performed in the mobile device, the RF system's receiver antennae provide the reference frame in which the mobile antennae are tracked. More receiver antennae provide better coverage and more accuracy but do so with increased complexity and cost. The receiver antennae must be distinct, fixed, and have a known location in space. More transmitter antennae attached to or embedded in a tracked object allow the object's orientation to be calculated based on geometric principles. For example, two transmitter antennae, separated by a distance D, yield a pointer, since the two transmitter antennae form a line with known direction. Three transmitter antennae provide enough information to calculate three-dimensional position and orientation. The system can be reversed, with the receiver antennae being tracked and the transmitter antennae providing the reference frame.

The major source of error in RF positioning systems is signal propagation errors, such as multi path. While many methods have attempted to mitigate this problem (antennae diversity, spread spectrum), signal propagation errors are very difficult to totally eliminate. A sourceless navigation system does not have these issues but does have its own set of problems. Sourceless navigation systems are typically based on inertial sensors, which can consist of accelerometers and gyroscopes, as well as magnetic sensors. The use of small inertial sensors, like gyroscopes and accelerometers, has become commonplace in position tracking. Inertial sensors overcome problems like line-of-sight restrictions that plague tracking systems. Unfortunately, commercial, low-cost devices have drift, bias and scale factor errors and orientation motion and positional motion need to be algorithmically separated.

A positioning solution is obtained by numerically solving Newton's equations of motion using measurements of forces and rotation rates obtained from the inertial sensors. The magnetic sensor helps to define azimuth based on the earth's magnetic field. The accelerometer, gyroscope, and magnetic sensor, and various combinations thereof, together with the associated hardware and electronics comprise the inertial/magnetic devices subsystem (IMDS).

Angular orientation may be determined by integrating the output from angular rate sensors. A relatively small offset error on the gyroscope signal will introduce large integration errors. Accelerometers measure the vector sum of acceleration of the sensor and the gravitational acceleration (g). In most situations, g is dominant, thus providing inclination information that can be used to correct the drifted orientation estimate from gyroscopes. The principles for measuring orientation of a moving body segment fusing gyroscopes and accelerometers in a Kalman filter have been described in H. J. Luinge, "*Inertial Sensing of Human Movement*" (Ph.D. Thesis, 2002), and is incorporated by reference herein in its entirety. The magnetic sensor is sensitive to the earth's magnetic field and it gives information about the heading direction in order to correct drift of the gyroscope about the vertical axis. Methods for integrating these devices are described in E. R. Bachman, "*Inertial and Magnetic Tracking of Limb Segment Orientation for Inserting Humans into Synthetic Environments*" (Ph.D. Thesis 2000), and E. Foxlin, *Inertial Head-Tracker Sensor Fusion by a Complementary Separate-Bias Kalman Filter* Proc. of VRAIS '96, 185-94 (1996), both incorporated in their entireties by reference herein.

These Kalman filter implementations use accelerometers and magnetic sensors for low frequency components of the orientation and use gyroscopes to measure faster changes in orientation. Finally, an accelerometer-only based position and orientation tracker is disclosed in "*Design and Error Analysis of Accelerometer-Based Inertial Navigation Systems*," by Chin-Woo Tan Sungsu Park for the California Partners for Advanced Transit and Highways (PATH).

Methods for integrating similar IMDS components with GPS, acoustic, optical and magnetic tracking systems are known in the art. Some examples include "*Robust Dynamic Orientation Sensing Using Accelerometers: Model-based Methods for Head Tracking in AR*", by Matthew Stuart Keir, "*Accelerometer-based Orientation Sensing for Head Tracking in AR & Robotics*," by Matthew S. Keir, et al, "*Using Gravity to Estimate Accelerometer Orientation*," by David Mizell, "*Setting up the MMA 7660FC to do Orientation Detection*," Freescale Semiconductor AN3840, "*3D Orientation Tracking Based on Unscented Kalman Filtering of Accelerometer and Magnetometer Data*," Benoit Huyghea et al., "*Inertial and Magnetic Sensing of Human Movement near Ferromagnetic Materials*," Daniel Roetenberg et al., "*An Extended Kalman Filter for Quaternion-Based Orientation Estimation Using MARG Sensors*," Joao Luis Marins et al., "*An Improved Quaternion-Based Filtering Algorithm for Real-Time Tracking of Human Limb Segment Motions using Sourceless Sensors*," Eric Bachmann et al., and are incorporated by reference herein in their entireties. In addition to these patents, the general methods for incorporating GPS and sourceless sensors are described in "*The Global Positioning System & Inertial Navigation*," by J. Farrell and M. Barth, (McGraw-Hill 1999); "Global Positioning Systems, Inertial Navigation and Integration," by M. Grewal, L. Weill, and A. Andrew, (John Wiley and Sons 2001); and "*Introduction to Random Signals and Applied Kalman Filtering*," by R. Brown and P. Hwang (John Wiley & Sons 1983). These references are also incorporated by reference in their entireties.

SUMMARY

No examples exist of RF-based position tracking systems that use inertial devices in a tracked mobile device to increase stability of the mobile device's RF signals received at the system's antennae. Therefore, what is needed is an RF position tracking system that tracks the position of one or more wireless mobile devices in two or three dimensions, improves on the limitations of GPS systems, and effectively integrates inertial sensing information in a combined system that allows the user to obtain a more stabilized and accurate position solution.

It is an object of the invention to provide a position tracking system that avoids the satellite and receiver clock errors of GPS systems.

It is also an object of the invention to provide a position tracking system capable of tracking the location of a transmitter in two or three dimensions.

It is also an object of the invention to provide a system that reduces the signal propagation errors of RF position tracking systems.

It is also an object of the invention to provide a system that reduces the drift, bias, and scale factor errors of sourceless navigation systems.

It is also an object of the invention to integrate an inertial/magnetic subsystem (IMDS) in a mobile device to better perform tracking by increasing stability of the system's received RF signals.

It is also an object of the invention to integrate an RF positioning system with an inertial/magnetic devices subsystem (IMDS) to provide long-term position stability and accuracy, even when the RF positioning system experiences temporary loss of signal.

It is also an object of the invention to use Kalman filter implementations in a RF system having accelerometers, magnetic sensors, and/or gyroscopes to measure faster changes in orientation.

It is also an object of the invention to use inertial sensors to reduce battery consumption allowing the device to transmit its radio signal only when it is moving.

It is also an object of the invention to use inertial sensors for constant tracking between the device and the system to maintain absolute position monitoring.

The present invention relates to RF position tracking system that tracks, in two or three dimensions, one or more wireless mobile device(s). The disclosure features utilizing an inertial/magnetic subsystem (IMDS) integrated in the mobile device to better perform tracking by adding stability to the system's RF signals received at the system's receiver (s). As RF signals from the mobile device are received at the system receiver, inertial information is also received that helps the system screen interference and multipath by weighting the RF data to best match the inertial data provided by the IMDS. The combined system allows a user to obtain a more stabilized/accurate position solution.

One embodiment of the invention is a system for wirelessly tracking the physical position of an object. The system has at least one radio frequency (RF) device having an antenna and at least one inertial sensor. The RF device is configured to emit a radio signal. The system has at least three receiver antennae that are each configured to receive a radio signal emitted by the device and transmit that signal to a receiver. The system also has a receiver in communication with the three or more receiver antennae. The receiver is configured to receive the radio signal from each receiver antenna and is further configured to communicate data to a data processor. Another embodiment comprises a positioning and/or navigation method and system thereof, in which the acceleration and/or velocity and/or position and/or heading from an inertial/magnetic navigation subsystem is/are used to supplement the carrier phase tracking of the RF positioning system signals, so as to enhance the performance of the RF positioning system during signal corruption or loss.

In another embodiment, a positioning and navigation system receives the acceleration, velocity, position, and/or heading measurements from an inertial/magnetic navigation subsystem. The inertial sensor measurement(s) is/are fused in a Kalman filter to supplement the carrier phase tracking of the RF positioning system signals, so as to enhance the performance of the RF positioning system during signal corruption or loss.

In another embodiment, the present invention provides an automatic power up/power down method that relies on the inertial/magnetic devices subsystem (IMDS). When the IMDS has detected no motion for a period of time, the RF positioning system is powered to a low power state. When motion resumes, the RF positioning system is returned to a full power state. In this way extended battery life may be achieved.

A method of tracking an object having an inertial sensor and capable of transmitting an RF signal includes each one of at least three antennae receiving an RF signal transmitted from an object to be tracked. The antennae receive an inertial signal from an inertial sensor integrated into or fixed onto the object. The system processes the RF signal and the inertial signal to determine the position of the object.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

Figure 1:
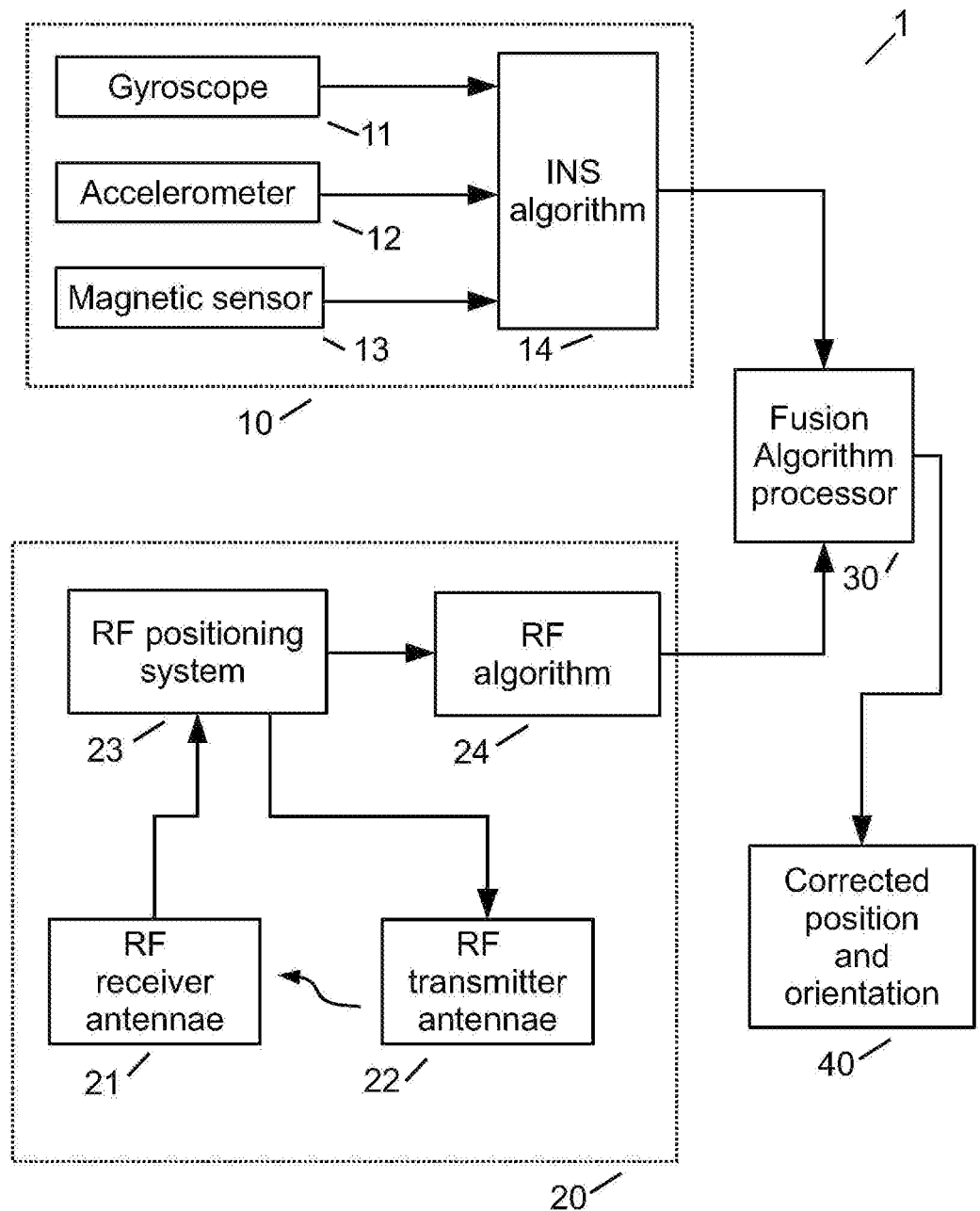
FIG. 1 is a block diagram illustrating an embodiment of a positioning and navigation system in which RF-based positioning system measurements and an inertial devices subsystem measurement are blended.

FIG. 1 illustrates one embodiment of a positioning and navigation system 1. The positioning and navigation system 1 includes inertial/magnetic devices subsystem 10 (IMDS), an RF tracking system 20, a fusion algorithm processor 30 and a corrected position and orientation output interface 40. The inertial/magnetic devices subsystem 10 (IMDS) may include gyroscopes 11, and/or accelerometers 12 and/or magnetic sensors 13, with their accompanying signal conditioning methods and algorithms processor 14. INS algorithm block 14 may be based on Kalman filtering techniques. The RF tracking system 20 comprises a set of RF receiving antennae 21, a set of RF transmitting antennae 22, RF system hardware 23, a tracking processor 24, a fusion algorithm processor 30, and a corrected position and orientation output interface 40.

The gyroscope 11 may be based on fiber optics, ring lasers, vibrating masses, micro-machined devices (MEMS technology), or other technology. A typical three-axis MEMS-based gyroscope 11 is the Analog Devices ADIS 16354, a high precision tri-axis inertial sensor. Multiple, single-axis gyroscopes could also be used.

The accelerometer 12 may be piezo-electric, capacitive, strain, optical, surface wave, micro-machined (MEMS technology) or one of the many other types of technologies used for measuring acceleration. A typical three-axis MEMS accelerometer 12 is the Analog Devices ADXL325, a three-axis analog accelerometer. The magnetic sensor (magnetometer) 13 can be a Hall effect, GMR, moving coil, magneto resistive, SQUID, spin dependent tunneling, proton precession, flux-gate, or other type of technology. An example of a three-axis magneto resistive magnetometer is the Honeywell HMC1 043 three-axis magnetic sensor.

Finally, IMDS subsystem 10 may also consist of a complete integrated solution, as exemplified by the Razor IMU for Sparkfun Electronics, a 9 degree-of-freedom system that incorporates three devices-an InvenSense ITG-3200 (triple-axis gyro), Analog Devices ADXL345 (triple-axis accelerometer), and a Honeywell HMC5883L (triple-axis magnetometer). The outputs of all sensors 11, 12, 13 are processed by an on-board Atmel ATmega328 RISC processor 14 and the navigation solution, which is represented by the corrected position and orientation block 40 is output over a serial interface.

The RF tracking system 20 includes a set of RF receiving antennae 21, a set of RF transmitting antennae 22, RF system hardware 23 and a tracking processor 24. The RF receiving antennae 21 and the transmitter antennae 22 can be a dipole, patch or other antennae appropriate for the particular wavelength. Various combinations of antennae may also be used. The RF system hardware 23 includes RF components that are explained more fully in the description of FIG. 2. The processed results from RF system hardware 23 are converted to a position and orientation solution by tracking processor 24. Tracking processor 24 may include a DSP, embedded processor or other such processing system that runs an algorithm to compute the position and orientation from the processed results.

Figure 2:
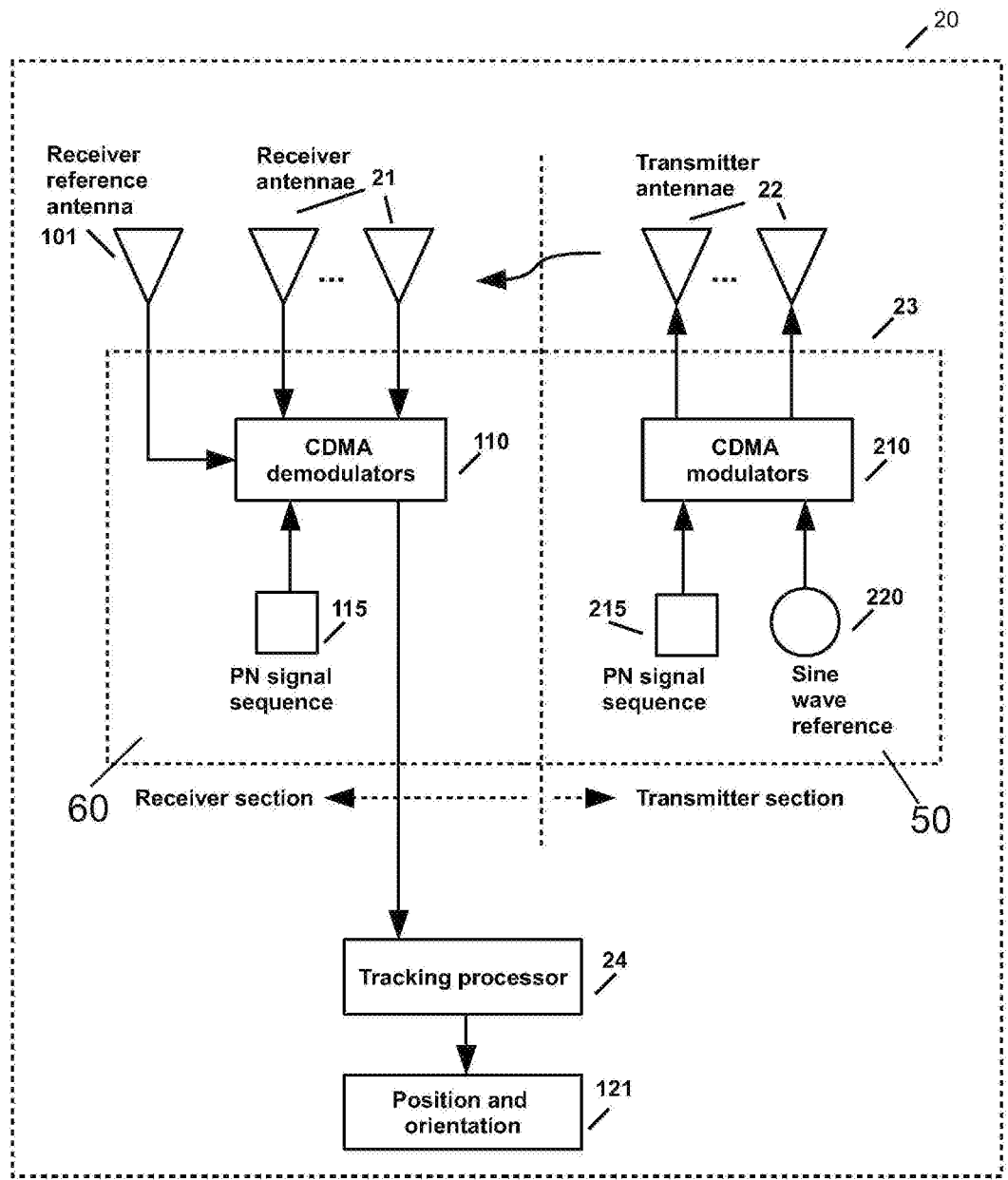
FIG. 2 is a block diagram illustrating an embodiment of an RF tracking system compatible with the positioning and navigation system of FIG. 1, in which RF signal measurements are used to determine the position of a set of transmitter antennae with respect to a set of receiving antennae.

As shown in FIG. 2, the RF tracking system 20 includes multiple receiver antennae 21, one or more transmitter antennae 22 and transmitter hardware, and RF system hardware 23. RF system hardware 23 may consist of amplifiers, limiters, filters, signal sources, demodulators, modulators, and other devices. These devices may be separate entities, may be embedded mathematically in a DSP or processor, or may be a combination of separate and embedded devices.

The transmitter section 50 consists of a sine wave 220 modulated with a pseudorandom noise sequence 215 by CDMA modulator 210. This type of modulation may be of the type found in cell phones and other communication devices. The signal is amplified (not shown) and sent to transmitter antenna 22.

In the receiver section 60, the signal is received by the receiver antennae 21 and receiver reference antenna 101. Receiver antenna 101 is the reference from which the time difference of arrival is measured. The receiver antennae receive the transmitted signal and forward these signals to the receiver circuitry 110 for demodulation using another pseudo-random noise (PN) sequence 115. PN sequence 115 may be identical to PN sequence 215, although not synchronized to it in time (in other words, the starting points are not the same). This means that both sequences contain the identical pseudo-random data, but that the data is read from different starting positions. CDMA demodulators 110 retrieve the transmitted sine wave from sine wave generator 220. Within the tracking processor 24, which may be a DSP (or microprocessor), the recovered reference sine wave is shifted by 90° so that when the other signals are multiplied by it and then integrated, the reference sine wave provides a measure of phase shift between the reference and the other received signals (i.e., differential phase). The differential phases are used by the position and orientation algorithm in the tracking processor 24 to determine position and orientation 121 of a tracked object.

Tracking a single transmitter device or transmitter antenna in three dimensions requires at least four receiver antennae 21; tracking in two dimensions requires at least three receiver antennae 21. The receiver antennae 21 provide the reference frame in which the transmitter antennae are tracked. More receiver antennae 21 provide better coverage and more accuracy but do so with increased complexity and cost. The receiver antennae 21 must be distinct and their respective locations known in space. More transmitter antennae 21 attached to or embedded in a tracked object allow the object's orientation to be calculated based on geometric principles.

For example, two transmitter antennae 22, separated by a distance D, yield a pointer, since the two transmitter antennae 22 form a line with known direction. Three transmitter antennae 22 provide enough information to calculate a three-dimensional orientation. The system 1 can be reversed, with the receiver antennae 21 being tracked and the transmitter antenna 22 providing the reference frame. Recent art can be found in "*Communication Systems Engineering*," by Proakis and Salehi, and is incorporated by reference herein. Many variations possible to achieve the same functionality and many of the noted components can be part of an integrated DSP. For example, a DSP might generate sine wave 220 and PN sequence 215. Discrete multipliers and integrators might be implemented in hardware instead of firmware.

The inertial/magnetic devices subsystem 10 (IMDS) provides inertial and magnetic field measurements including body angular rates, specific forces, and information on the Earth's magnetic field direction which are sent to the fusion algorithm processor 30 for minimizing RF tracking system errors during loss or corruption of RF signal. In one embodiment, the position and orientation of the transmitter antennae 22 are calculated in RF algorithm block 24.

The position and orientation algorithm is based on solving the underlying range equations. In this phase-based system, the phase is used to measure range. The operating wavelengths of the RF tracking system provide ambiguous phase measurements because phase measurements are modulo $2\pi$ numbers. Without further information, only the fractional part of the phase can be determined, making the incorrect. Equations (1)-(3) illustrate the phase to range measurement relationship. $\rho n$ is the range, $\lambda$, is the wavelength (for a fixed frequency), $\Phi n$ is the measured phase and kn is the integer portion of the phase. Methods exist to determine the additional integer number of wavelengths corresponding to the actual range, but it should be noted that problems due to multipath, line-of-sight issues, and other problems can lead to loss of tracking.

$$\rho_1 = \lambda\left(\frac{\Phi 1}{2\pi} + k1\right) \quad (1)$$

$$\rho_2 = \lambda\left(\frac{\Phi 2}{2\pi} + k2\right) \quad (2)$$

$$\rho_n = \lambda\left(\frac{\Phi n}{2\pi} + kn\right) \quad (3)$$

One way to measure the phases is against a fixed reference phase. By measuring the transmitter signal's phase differences recorded at two receiver antennae the distance is calculated. In the following equations, values $\rho 1$-$\rho 4$ represent distances between the receiver antennae positions and the transmitter position and are determined by the phases. Receiver positions are denoted as $rcvr\_pos_{receivernumber,positioncoordinate}$, and are fixed, known quantities. Position coordinate $x_{1,2,3}$ represent x,y,z, respectively.

$$\rho 1 = \sqrt{(rcvr\_pos_{1,1} - x_1)^2 + (rcvr\_pos_{1,2} - x_2)^2 + (rcvr\_pos_{1,3} - x_3)^2} \quad (4)$$

$$\rho 2 = \sqrt{(rcvr\_pos_{2,1} - x_1)^2 + (rcvr\_pos_{2,2} - x_2)^2 + (rcvr\_pos_{2,3} - x_3)^2} \quad (5)$$

$$\rho 3 = \sqrt{(rcvr\_pos_{3,1} - x_1)^2 + (rcvr\_pos_{3,2} - x_2)^2 + (rcvr\_pos_{3,3} - x_3)^2} \quad (6)$$

-continued $$\rho 4 = \frac{(7)}{\sqrt{(rcvr\_pos_{4,1} - x_1)^2 + (rcvr\_pos_{4,2} - x_2)^2 + (rcvr\_pos_{4,3} - x_3)^2}}$$

Phase differences such as formed from manipulating equations (4)-(7) into differences ρ4–ρ1, ρ3–ρ1, and ρ2–ρ1 provide the same information for determining position while allowing one of the received signals to act as a common reference.

These four equations are used to solve for $x_1$, $x_2$ and $x_3$, in the RF algorithm 24, which represents the x,y,z, position of the transmitter, respectively. This can be solved in a least squares algorithm, such as Levenberg-Marquardt or in a Kalman filter, as noted in the references.

There are many ways to combine the various data streams. According to Gautier in "*GPS/INS Generalized Evaluation Tool (GIGET) for the Design and Testing of Integrated Navigation Systems*," a loosely-coupled system calculates position using the RF solution only. The IMDS computes position, velocity and attitude from the raw inertial sensor measurements and uses the RF solution to fix the IMDS errors. A benefit of a loosely coupled system is that the RF system can be treated as a "black box." In tightly coupled systems, the Kalman filter receives phase measurements of range. Ultra-tightly coupled system utilize contain feedback to the RF system itself. However, in "*The Global Positioning System and Inertial Navigation*," by Farrell and Barth, loosely coupled is defined in a more general manner (reference section 7.2.2 and accompanying figures) and allows for some feedback mechanisms to exist. The ultra-tightly coupled method of Gautier is equivalent to Farrell and Barth's version of tightly coupled. For this reason, and because it is more general, the definition of coupling will be based on Farrell and Barth's description in what follows.

Referring to FIGS. 3-6, the fusion algorithm processor 30 is shown as a separate processor, which may again take the form of a DSP or microprocessor subsystem. Its job is to combine the inertial/magnetic devices subsystem 10 (IMDS) outputs with those of the RF tracking system algorithm 24 in what might be called an uncoupled form of fusion or unaided inertial solution. Methods of merging the data could require ad-hoc methods to prevent errors from becoming unbounded. Merging these data streams could be done in a Kalman filter. The Kalman filter provides corrected position and orientation outputs 40 by combining the two outputs which could arrive at the fusion processor 30 at different rates. It is also possible to combine algorithm processing 14, 30 and 24 into a single processor for all the algorithms or to combine various portions as necessary.

This x,y,z position solution from RF algorithm 24 is incorporated into the fusion algorithm processor 30, which preferably includes a linearized or extended Kalman filter. The Kalman filter 33 is a recursive filter that estimates the state of a dynamic system. It is commonly used in data fusion applications, among others. The Kalman filter 33 is used to combine, in an optimal manner, the RF tracking system 20 data with those of the IMDS subsystem 10. If the filter 33 detects short term divergence of the RF and IMDS subsystem, it weights the final solution towards the IMDS information and supplies a corrected position and orientation output 40.

Figure 3:
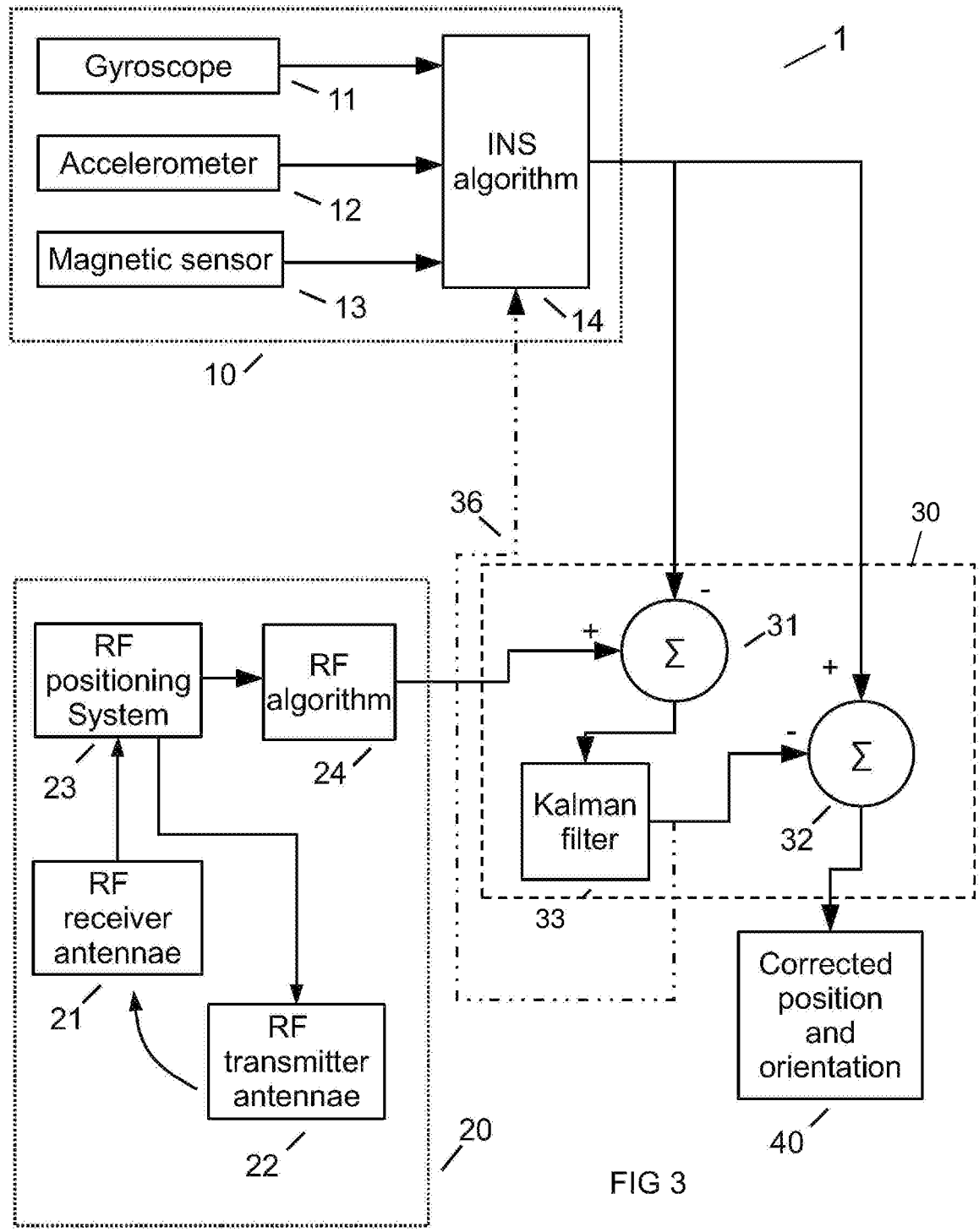
FIG. 3 is a block diagram showing an embodiment of a positioning and navigation system having a RF position-aided IMDS design.

FIG. 3 represents different approaches to the second embodiment of the system 1. When interface 36 is not included, the result is a linearized Kalman filtering approach. When it 36 is there, the result is an extended Kalman filter. Linearized Kalman filters are derived assuming a linearization was performed around the operating point of the filter. Extended Kalman filters utilize non-linear models. Both filters have pros and cons, such as implementation simplicity and speed of processing.

In this second embodiment, the fusion of RF tracking and inertial tracking is performed in a loosely coupled manner. In loosely-coupled fusion, a link 36 sends the error signal from the Kalman filter 33 to the inertial sensing processor 14 to modify the IMDS 10 output. A feed-forward, complementary filter design, also known as a RF position aided IMDS design, is shown in FIG. 3. Many of the main blocks were already defined in FIG. 1. At the instant at which the GPS measurement is valid, the IMDS state is saved and used for comparison with the RF data. By driving the Kalman filter 33 with the error between the RF data and the IMDS data (output of block 31), it is valid to estimate the navigation error state based on a linearized system model. Second, since the filter is designed based on an error model, all model parameters can be properly defined in a stochastic sense. Third, the responsiveness of the navigation system is determined primarily by the update rate of the IMDS system 10 (assuming it has a faster update rate than the RF system) and the bandwidth of the inertial sensors 11, 12, 13. Fourth, because the Kalman filter 33 estimates slowly-varying error quantities, the system 1 can be a low-bandwidth system to attenuate any high-frequency error on the RF aiding signal. This error value is subtracted from the IMDS solution in block 32 to remove errors that occur over time in the IMDS system 10.

If link 36 is added, the INS algorithm 14 can be modified to take the error signal generated by Kalman filter 33 and modify the IMDS 10 output at the computation source. This can reduce offsets and biases that are common in inertial hardware 11, 12, and 13.

Figure 4:
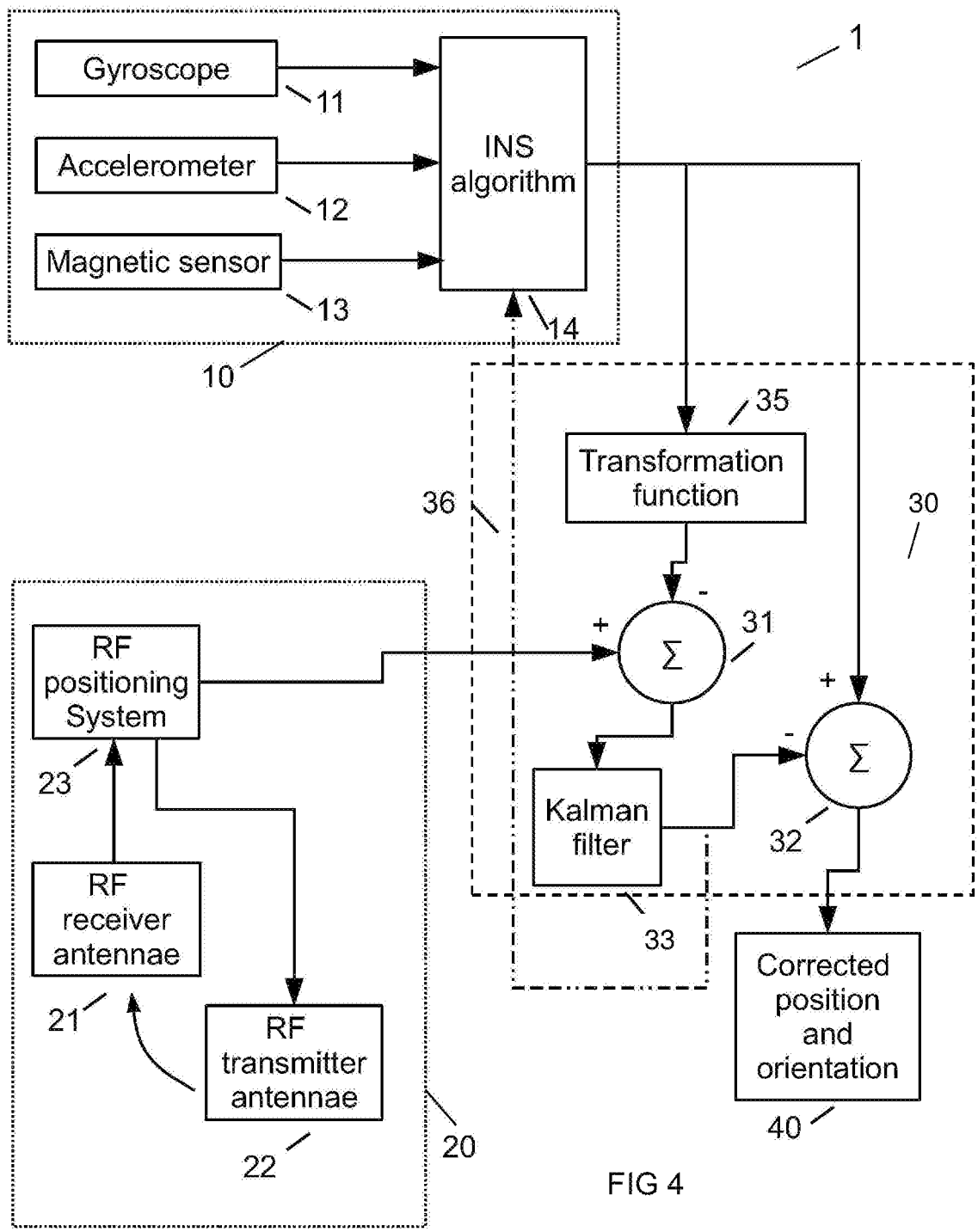
FIG. 4 is a block diagram showing an embodiment of a positioning and navigation system having a RF range-aided IMDS design.

In a third embodiment shown in FIG. 4, the fusion of RF tracking and inertial tracking is performed in a loosely-coupled manner. As noted above, loosely-coupled fusion is when link 36 sends the error signal from the Kalman filter 33 to the inertial sensing processor 14 to modify the IMDS 10 output. An example of a feed-forward, complementary filter design, also known as a RF range-aided IMDS design, is shown in FIG. 4. Many of the main blocks were already defined in FIGS. 1 and 3. The RF algorithm, however, is now incorporated into Kalman filter 33. Transformation block 35 takes the position solution from the IMDS system 10 and converts it back into range data. Range error is determined in block 31 by subtracting this ranged data from that obtained from RF positioning system 23. This error range data output of block 31 is now used by Kalman filter 33 to compute a position or position and orientation error solution, which in turn, is used to correct output 40 via block 32. This embodiment also provides a means to correct phase errors that occur due to multipath, line-of-sight issues, and other sources, since cycle slippage due to the phase being modulo 2π numbers can be corrected.

Figure 5:
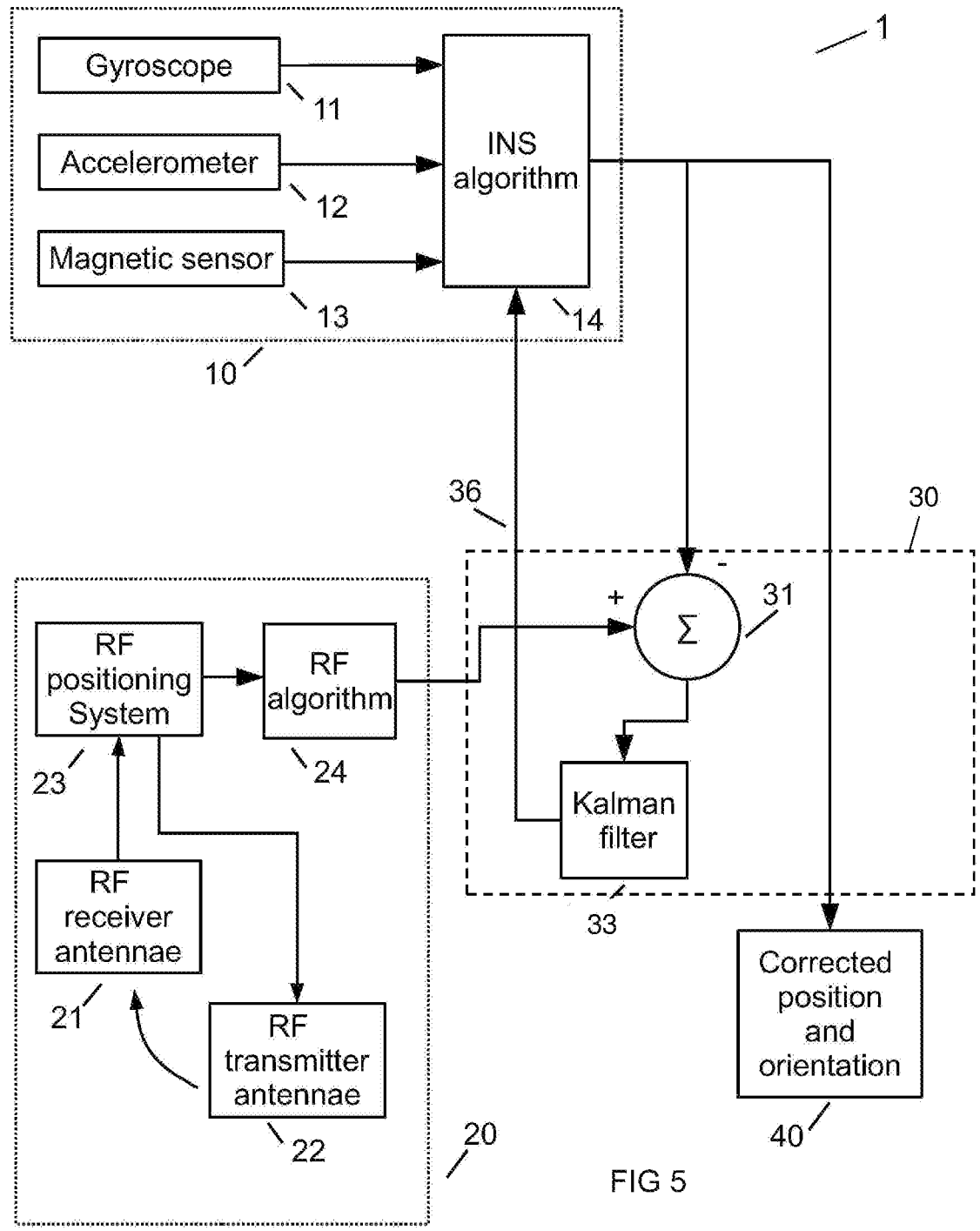
FIG. 5 is a block diagram showing another embodiment of a positioning and navigation system that implements feedback.

In an alternate embodiment shown in FIG. 5, if link 36 is added, the INS algorithm 14 can be modified to receive the error signal generated by Kalman filter 33 and modify the IMDS 10 output at the computation source 14. This can reduce offsets and biases that are common in inertial hardware 11, 12 and 13.

FIG. 5 shows another embodiment in which complementary filters may be designed for feedback implementation. In this embodiment, errors between the RF system 20 and the IMDS system 10 are produced by block 31. These errors are filtered by Kalman filter 33 to produce bias and drift compensation to the inertial components 11, 12 and 13.

Figure 6:
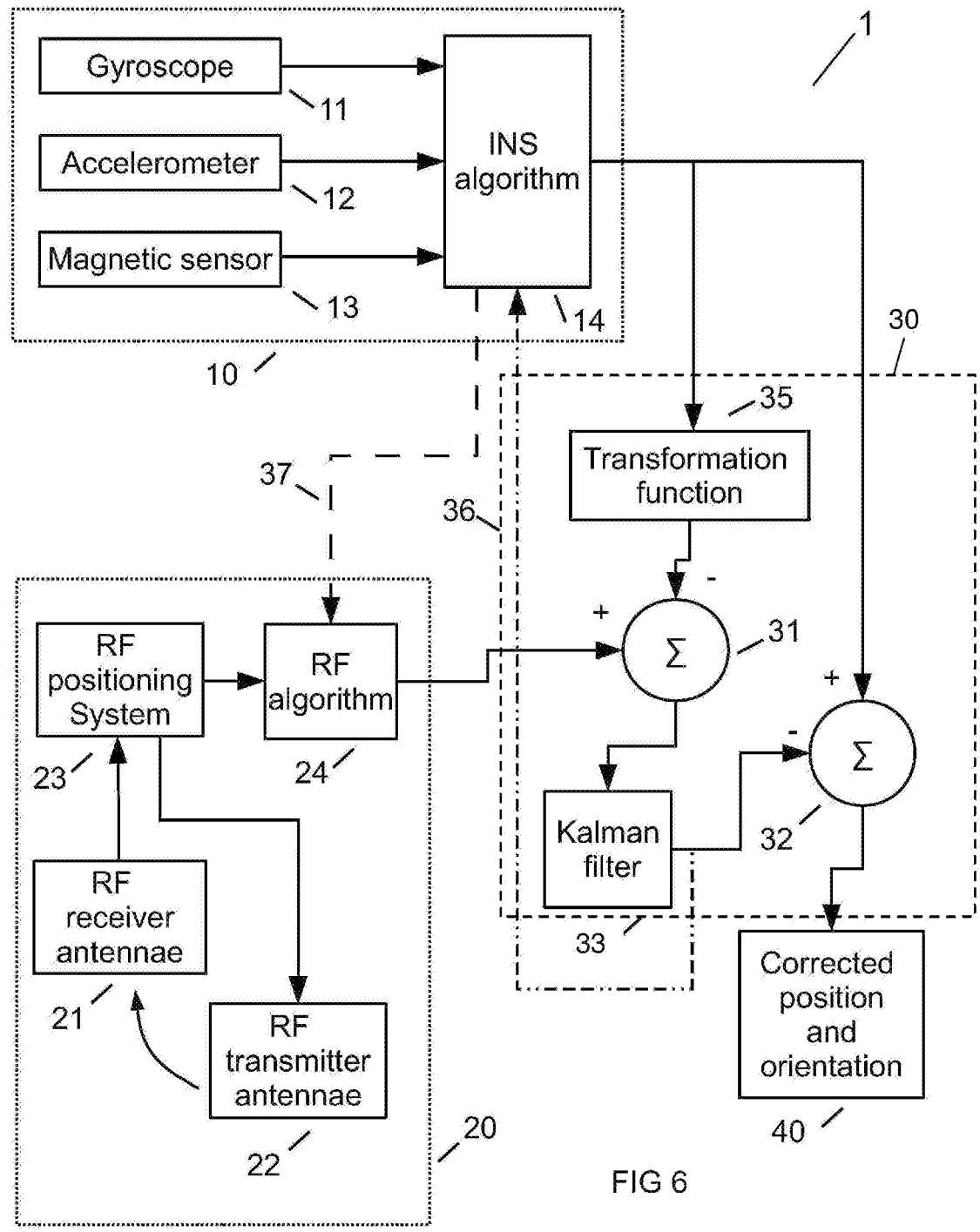
FIG. 6 is a block diagram showing an embodiment of a positioning and navigation system that incorporates acceleration and velocity data in a range-aided or position-aided IMDS design.

FIG. 6 shows another embodiment of the system 1 in which the fusion of RF tracking and inertial tracking is performed in a tightly-coupled manner. In tightly-coupled fusion, link 36 sends the error signal from the Kalman filter 33 to the inertial sensing processor 14 to modify the IMDS 10 output while interface 37 sends acceleration and velocity data to the RF algorithm 24. This embodiment has a feed-forward, complementary filter design, also known as a RF-aided IMDS design. This embodiment can be either position- or range-aided, as described previously. A difference in this embodiment is the addition of interface 37, which provides the RF algorithm 24 with acceleration and velocity data from the inertial hardware 11, 12, and/or 13. Interface 37 allows RF algorithm 24, which would preferably be a Kalman filter, to incorporate acceleration and velocity data into its model. This embodiment also provides a means to correct phase errors that occur due to multipath, line-of-sight issues, and other sources, since cycle slippage due to the phase being modulo 2n numbers, can be corrected.

An additional use for the accelerometers 12 is as a power-saving device. In this mode of operation, the accelerometer is monitored for periods of no acceleration (hence no velocity or positional changes). During these periods, the RF positioning system, especially the RF transmitters, can be put into a low or no power state. When movement resumes, which would cause an instantaneous acceleration to be measured, the RF transmitters could be powered up to resume RF tracking. Since the fusion algorithm processor 30 mediates this process, it would be able to keep track of the last computed position and orientation 40, and once acceleration is detected, apply corrections to the position and orientation based on the IMDS subsystem 10 measurements until the RF tracking system 20 comes back on line.

Depending on total system tracking requirements, including accuracy, cost limitations, or other constraints, one or more components of the inertial/magnetic devices subsystem 10 (IMDS) may or may not be present. Multiple units of each device 11, 12, and/or 13 may be used to sense various directional components. In a minimal embodiment, only one accelerometer 12 may be used to provide positional corrections over short periods of time. Also, while the fusion algorithm processor 30 is expected to run a Kalman filter, other methods for integrating the disparate measurements may be used.

Figure 7A:
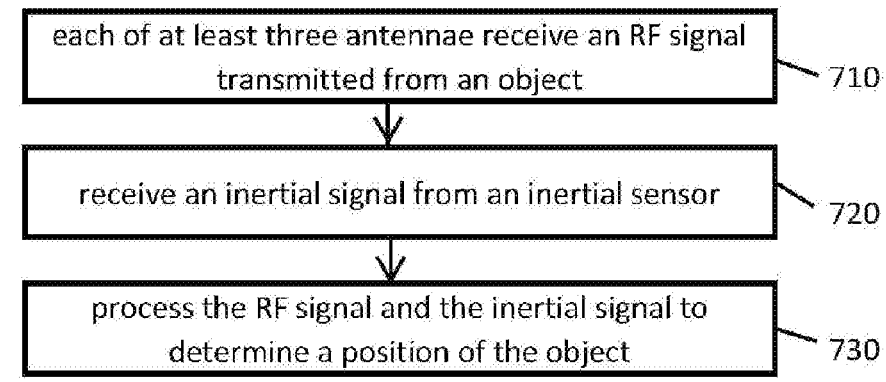
FIGS. 7*a* and 7*b* are flow diagrams for alternate embodiments of a method of tracking an object having an inertial sensor and capable of transmitting an RF signal.
Figure 7B:
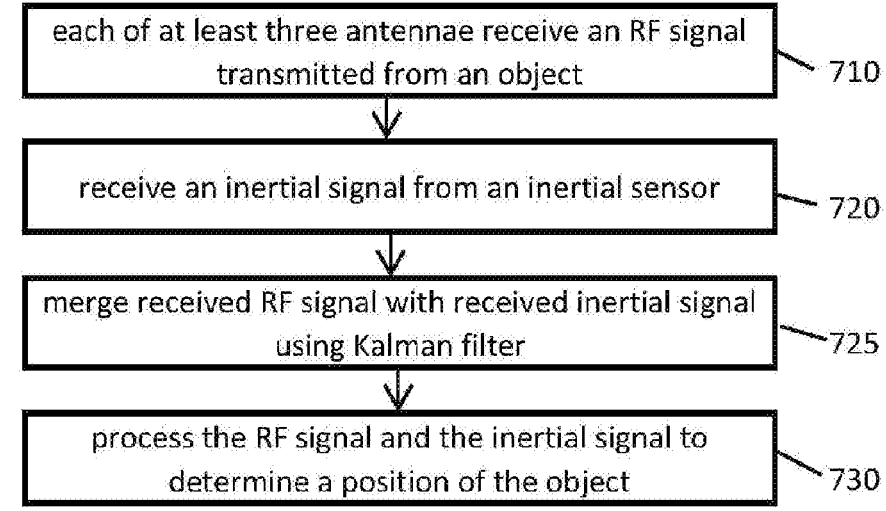

FIGS. 7a and 7b show a method 700 of tracking an object having an inertial sensor and capable of transmitting an RF signal. In step 710 of one embodiment, shown in FIG. 7a, each one of at least three antennae receives an RF signal transmitted from an object to be tracked. In step 720 the antennae receive an inertial signal from an inertial sensor integrated into or fixed onto the object. In step 730 the system processes the RF signal and the inertial signal to determine the position of the object.

In another embodiment of the method, shown FIG. 7b, the method 700 may also comprise the step 725 of merging the received RF signal with the received inertial signal using a Kalman or similar filter. In other embodiments of the method 700, one or more inertial sensors may be used, including combinations of gyroscopes, accelerometers, and magnetic sensors. Also, the processing step 730 may include applying a fusing algorithm to the received RF signal and the received inertial signal. The method 700 may be used to determine the position of an object in two or three dimensions as explained above regarding the system. Additionally, the processing step 730 may be broken into a first step of pre-processing the received RF signal and a second step of processing the inertial signal. The method 700 may also embody variations and combinations of each embodiment described above.

Aspects of the position tracking system 1 and method 700 for using radio signals and inertial sensing can be executed on various computing platforms and/or using various programing languages. Program aspects of the technology may be thought of as "products" or "articles of manufacture" typically in the form of executable code and/or associated data that is carried on or embodied in a type of machine readable medium. "Storage" type media include any or all of the memory of the computers, processors or the like, or associated modules thereof, such as various semiconductor memories, tape drives, disk drives and the like, which may provide storage at any time for the software programming. All or portions of the software may at times be communicated through the Internet or various other telecommunication networks. Such communications, for example, may enable loading of the software from one computer or processor into another computer or processor. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links or the like, also may be considered as media bearing the software. As used herein, unless restricted to tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Nonvolatile storage media include, for example, optical or magnetic disks, such as any of the storage devices in any computer(s) or the like, such as may be used to implement the data aggregator, the customer communication system, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

Those skilled in the art will recognize that the present teachings are amenable to a variety of modifications and/or enhancements.

All the elements of all the Figures having the same reference numbers have the same or similar functions.

The object or wireless device being tracked is referred to as tracked object or as mobile device 3. Examples of mobile devices include, but are not limited to, unmanned or manned aerial or terrestrial vehicles, such as drones, automobiles, and trucks.

Figure 8:
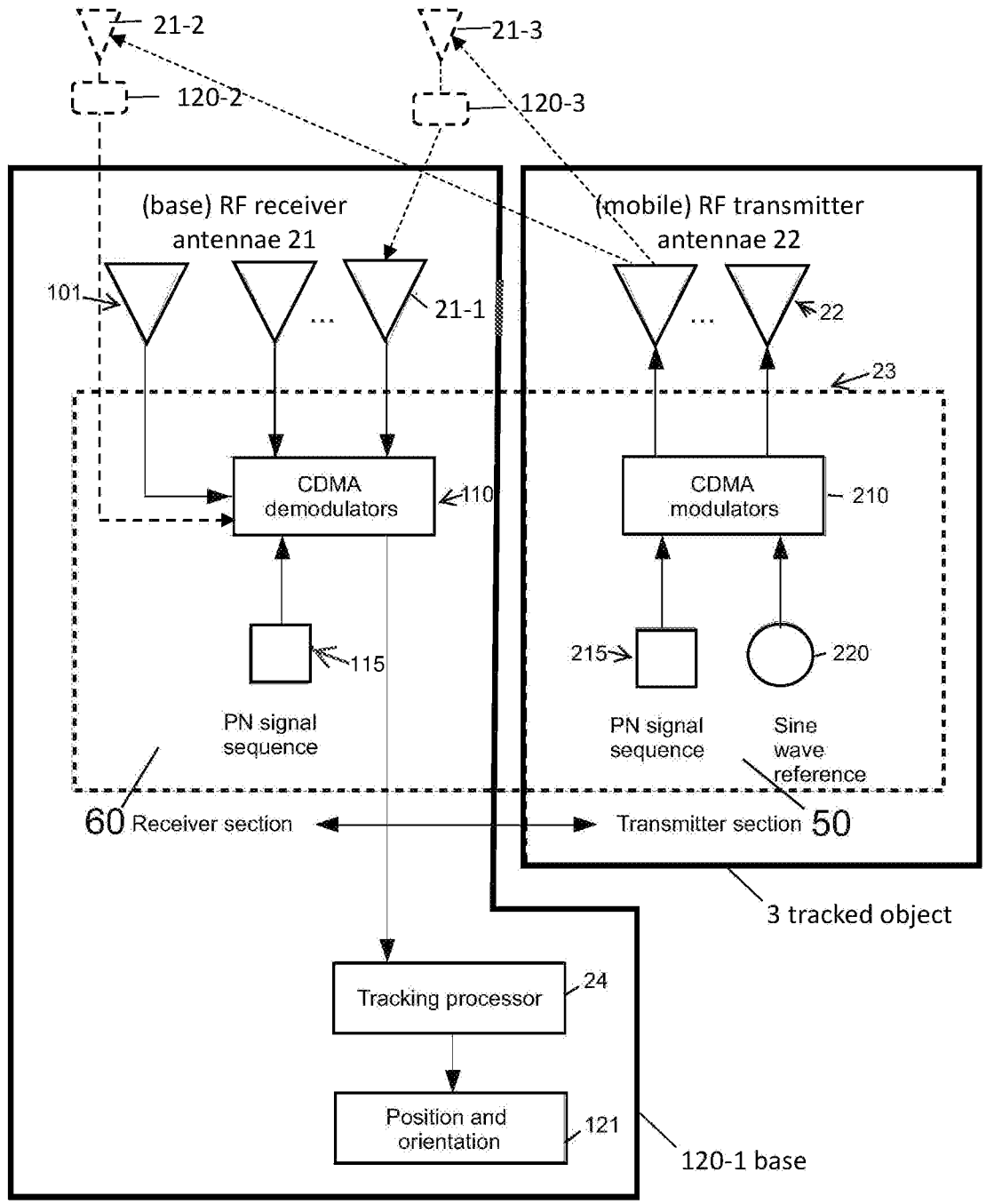
FIG. 8 is a block diagram illustrating the embodiment of a positioning and navigation system of FIG. 2 indicating where various functional blocks are located.

FIG. 8 shows one embodiment of the RF tracking system 20. In this embodiment, tracked object 3 includes transmitter section 50 having the RF transmission electronics and at least one (mobile) RF transmitter antenna 22. More than one RF transmitter antennae 22 allows for the position of each transmitting antenna 22 to be determined. If the positions of the RF transmitter antennae 22 on the tracked object 3 are known, then the relative positions will indicate an orientation angle around an axis of the tracked object 3. Using several RF transmitter antennae 22 would provide orientation angles around several axes.

This embodiment also includes multiple (base) RF receiver antennae 21 that are spaced apart from each other at various locations but are not located on the tracked object 3. These may be all located to a common base 120-1 or be located on several different bases 120-1, 120-2, 120-3. These bases 120-1, 120-2, 120-3 may be located apart from each other.

The bases 120-1, 120-2, 12-3 are required to communicate among themselves. These may be connected by wired communications, such as between base 120-1 and 120-2. They may also be connected by wireless communications, such as bases 120-1 and 120-3.

The steps of processing of the signals from the RF receiver antennae 21 may be performed at one base, or any number of processing steps may be performed at any of the other bases.

The RF receiver antennae 21 is connected to the receiver section 60, which includes CDMA demodulators 110 and the PN Sequence device 115.

The CDMA demodulators 110 communicate with the tracking processor 24. The tracking processor 24 provides output to the position and orientation device 121.

In this embodiment, the receiver section 60, tracking processor 24 and position and orientation processor 121 are not on the tracked object 3. These may be located remote from the tracked object, at a fixed base 120. This embodiment is designed to receive a signal transmitted by the tracked object 3 at the base 120, and to calculate the position and orientation of tracked object 3 at the base 120. Therefore, the tracked object 3 will not know its position and orientation. This information in this embodiment is only at the base 120.

Figure 9:
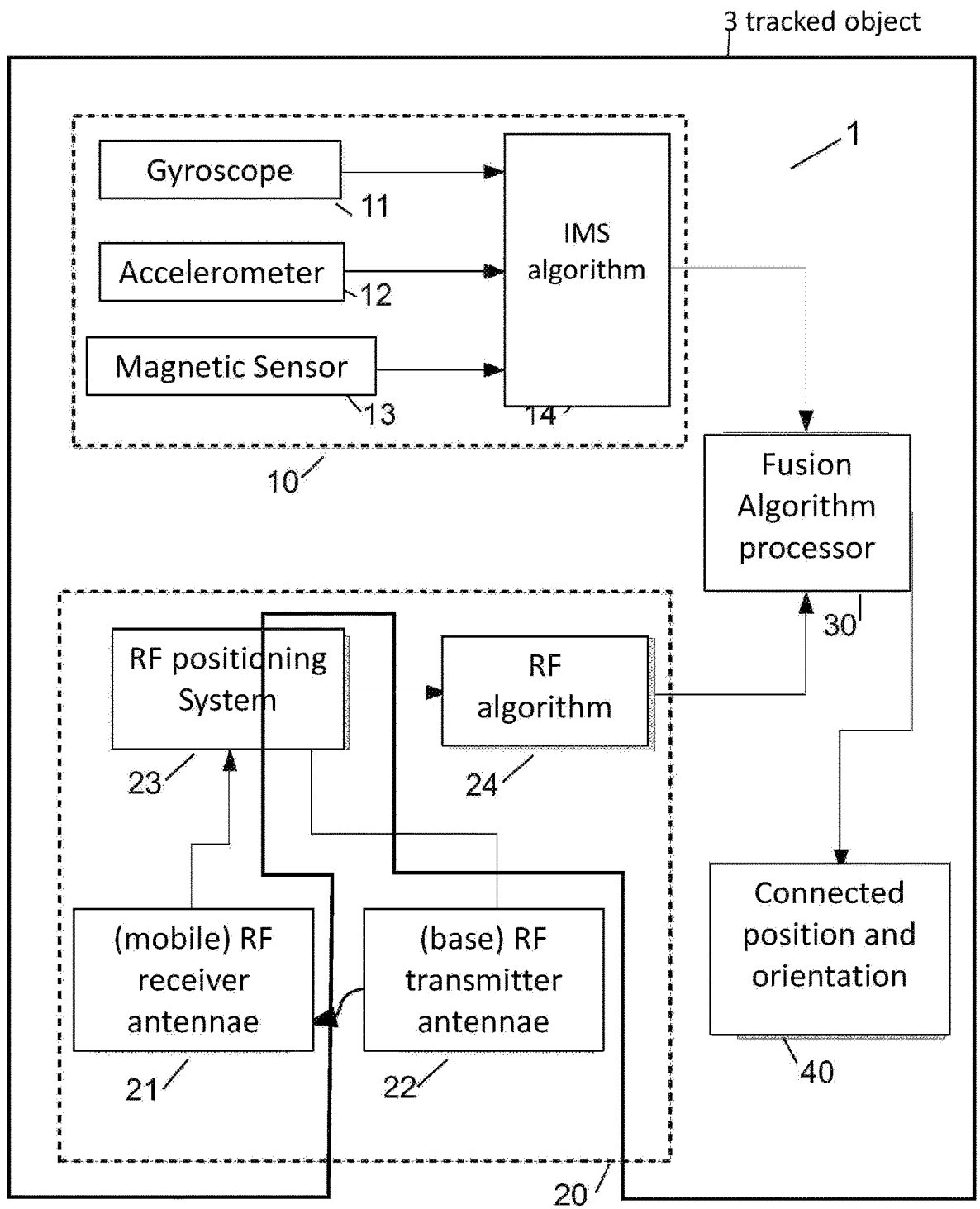
FIG. 9 is a block diagram illustrating an embodiment of a positioning and navigation system of FIG. 1 indicating where various functional blocks are located.

Referring now to FIG. 9, the tracked object 3 has an inertial/magnetic detection system (IMDS) 10 which uses inertia and magnetic sensors 11-13 to calculate its position and orientation. However, these calculations become less accurate over time and need to be reset with correct information from time to time.

Figure 10:
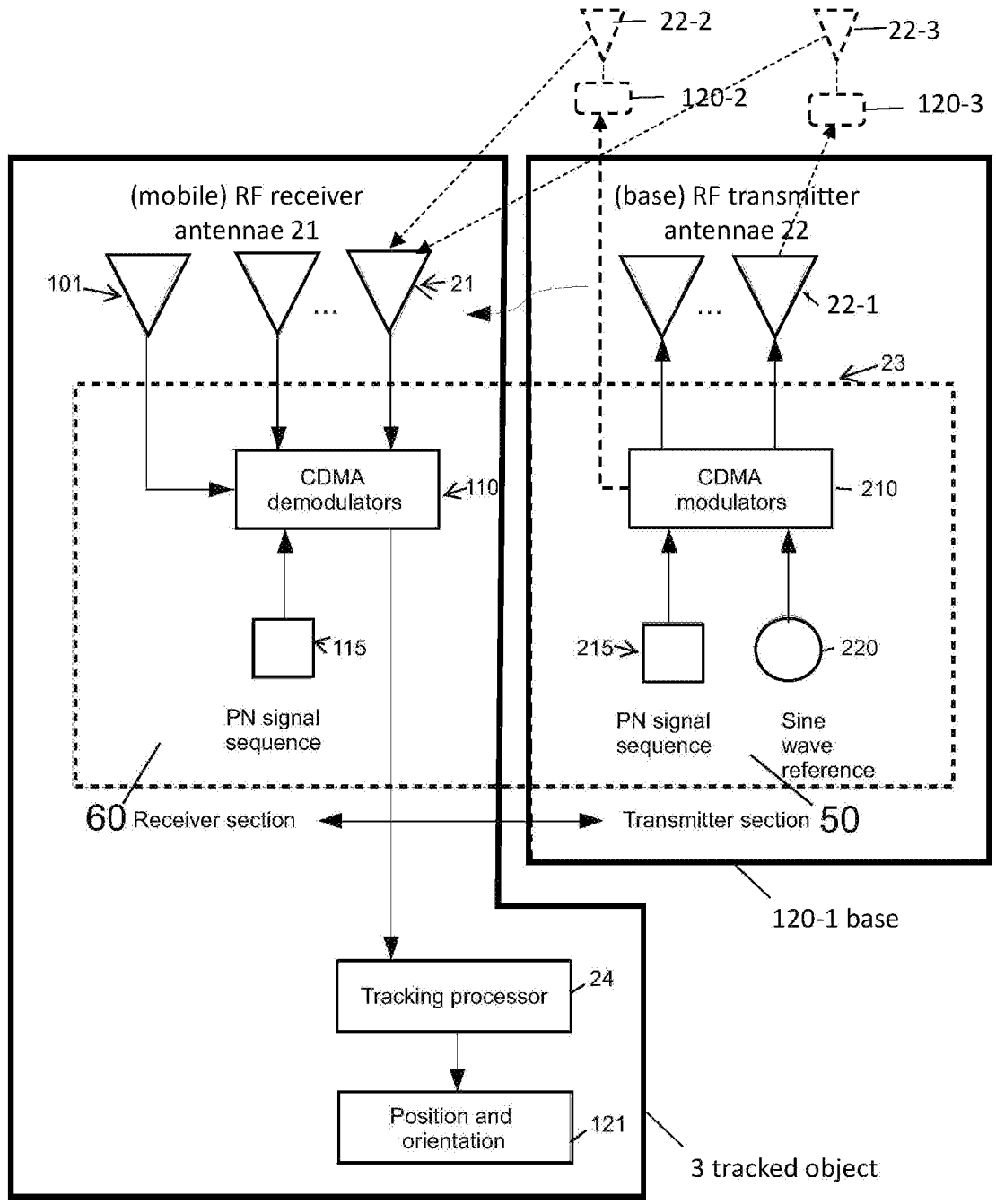
FIG. 10 is a block diagram illustrating another embodiment of an RF tracking system in which RF signal measurements are used to determine the position of a set of transmitter antennae at a base with respect to a set of receiving antennae on the tracked object.

An alternative embodiment of the current invention is shown in FIG. 10 in which the transmitter and receiver are reversed. In this embodiment, a plurality of (base) RF transmitter antennae 22 are spaced from each other and may be located on the same base 120-1, or located on more than one base 120-1, 120-2, 120-3. In one embodiment, the plurality of (base) RF transmitter antennae 22 include at least three spatially separated RF transmitter antennae 22, each disposed at a known location in three-dimensional space. The bases 120-1, 120-2 and 120-3 must be able to communicate with each other by wired or wireless communication. Bases 120-1 and 120-2 communicate by a direct wired communication link. However, bases 120-1 and 120-3 communicate with a wireless communication link.

A transmitter section 50 is connected to each RF transmitter antenna 22-1, (and optionally 22-2, 22-3) and causes them to transmit an RF signal.

The tracked object 3 has at least one (mobile) RF receiver antenna 21 that receives the RF signals. It can differentiate between the signals received from different RF transmitting antennae. The received signals are passed to a receiver section 60 having CDMA demodulators 110. The CDMA demodulators 110 receive the output of the PN signal sequence device 115 to process the signals.

The output of the CDMA demodulators 110 is provided to the tracking processor 24 that runs an RF algorithm that determines distances between the mobile antenna 21 and each of the base antennae 22 based upon the received RF signals.

The output of the tracking processor 24 is then provided to the position and orientation device 121 that calculates the positions and orientations of the tracked object 3.

Figure 11:
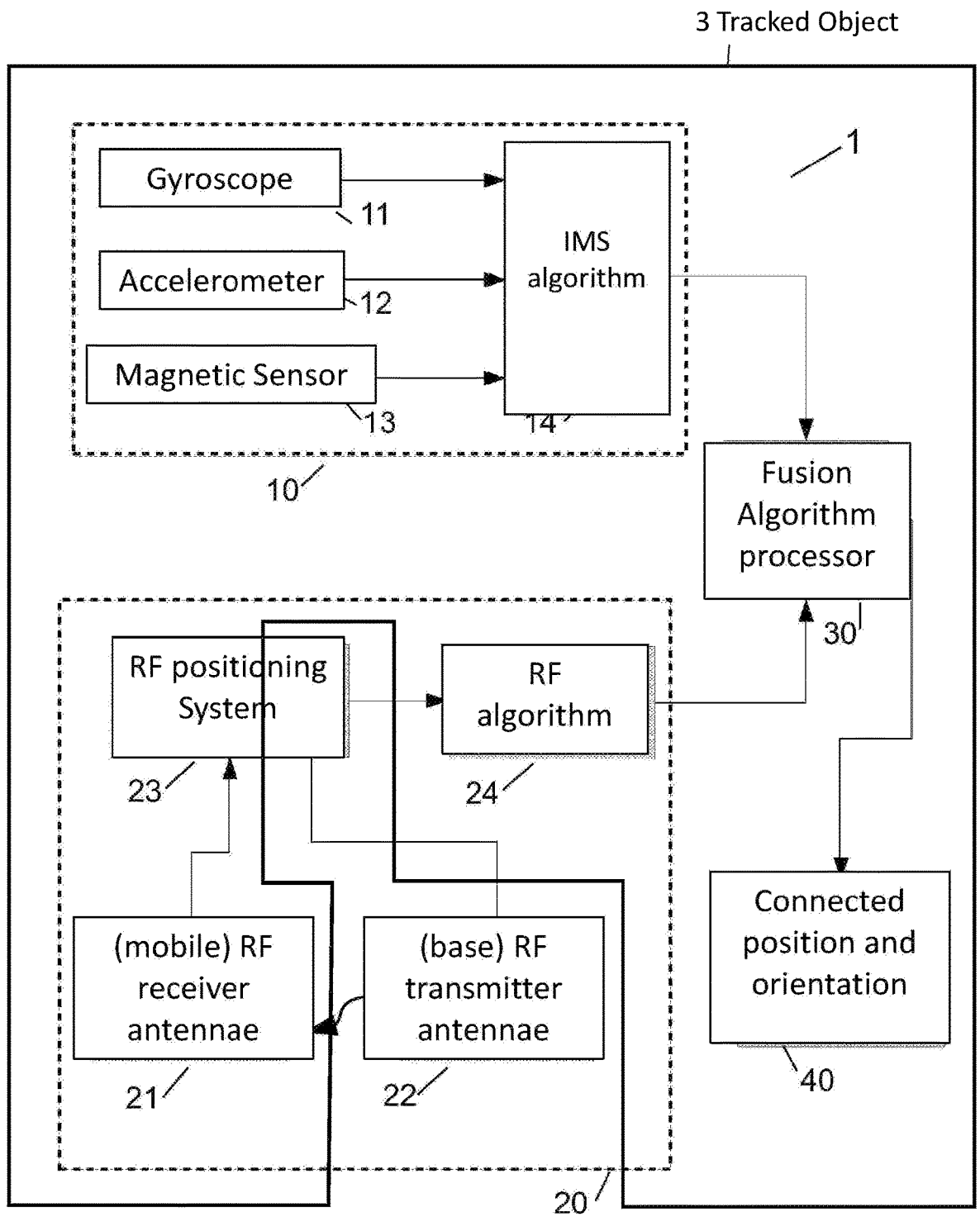
FIG. 11 is a block diagram illustrating an embodiment of a positioning and navigation system employing the RF tracking system of FIG. 10.

Turning now to FIG. 11, all the elements shown in this figure, except for the RF transmitter antennae 22 (and any required transmitting elements), are attached to the tracked object (i.e., mobile device) 3. This allows position and orientation calculations to be performed on-board the tracked object 3 from the received RF signals. In effect, the mobile device 3 is configured to be a self-positioning unit, that is, the mobile device determines its own position and orientation.

The tracked object 3 also includes an IMDS 10 (having the previously described inertial and magnetic sensors). The mobile device 3 determines its own position and orientation from information obtained by sensing inertia and/or magnetic field orientation. IMDS 10 monitors the inertia/magnetic field changes of the tracked wireless mobile device 3. The information from the IMDS 10 can create the location and orientation of the tracked wireless mobile device 3. However, the IMDS system 10 has inherent errors in its determinations of inertia. These errors accumulate for each determination. However, they are accurate for short periods of time.

The output of the RF tracking system 20 and the output of the IMDS 10 are fed to fusion algorithm processor 30. The fusion algorithm processor 30 uses the output from these devices to update the position and orientation of the tracked object 3. This embodiment employs a fusion algorithm processor 30 running a fusion algorithm that merges the position and orientation information determined by the IMDS with the position and orientation information determined from the RF signals, to produce a corrected position and orientation of the mobile device.

The fusion algorithm device 30 receives the location and orientation from both the IMDS 10 and the RF tracking system 20 and uses one or both the inputs to determine position and orientation.

Alternative embodiments of the fusion algorithm processor 30 are shown in FIGS. 3-6 and are described earlier in the specification. These show and describe the structure used to merge the output of the IMDS 10 and RF tracking system 20. In the embodiment of FIG. 11, all the elements shown in FIGS. 3-6 are located on the tracked object 3, except for the RF transmitter antennae 22 and the transmitter section 50 of the RF positioning system 23. In this case, the system may use a combination of the output of the RF tracking system 20 and IMDS 10 during normal operation. However, when the RF signal is weak, corrupted or missing, the system can use the IMDS 10 for tracking. Fusion algorithm processor 30 employs smoothing techniques to reduce tracking error.

The system in which position and orientation calculations are made at the base 120, may also be modified into an alternative embodiment capable of transmitting the calculated position and orientation of tracked object 3 from the base 120 back to the tracked object 3, so the tracked object 3 may know of its position and orientation. This would allow it to have previous location and orientation to use in calculations when the RF signal is corrupted or lost. However, this embodiment would require an additional transmitter in the base 120 and a receiver in the tracked object 3 and add to the cost of producing the system.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

What is claimed is:

1. A mobile device comprising:
   multiple receiver antennae each configured to receive radiofrequency (RF) signals transmitted by at least one RF transmission source for determining a position of the mobile device;
   a sensor configured to measure inertia of the mobile device; and
   at least one processor in communication with the sensor and the at least one receiver antenna, the at least one processor being configured to:
   receive inertial measurement data measured by the sensor;
   calculate, from position information of the RF signals, a first position of the mobile device;
   compare the position information of the RF signals and the inertial measurement data to modify a position stability of the RF signals; and
   calculate, from the inertial measurement data measured by the sensor and the calculated first position, a second position of the mobile device for tracking the mobile device, wherein the at least one processor is further configured to reduce power to the at least one receiver antenna when the sensor does not detect motion for a period.

2. The mobile device of claim 1, wherein the at least one processor is further configured to use a subsequent calculation of position information for the mobile device based on an inertial measurement as the position of the mobile device when the RF signals are weak, corrupted, or missing.

3. The mobile device of claim 1, wherein the at least one processor is further configured to apply a weight to the position information based on the inertial measurement in response to detecting a divergence between first and second position information of the position information.

4. The mobile device of claim 1, wherein the mobile device is an unmanned aerial vehicle.

5. The mobile device of claim 1, wherein the sensor comprises one or more accelerometers, zero or more gyroscopes, and zero or more magnetic sensors.

6. The mobile device of claim 1, wherein the at least one processor uses a Kalman filter to merge the position and orientation of the mobile device calculated from the received RF signals with the position and orientation information received from the sensor into a corrected position and orientation of the mobile device.

7. The mobile device of claim 1, wherein the at least one processor is further configured to restore the at least one receiver antenna to full power when the sensor detects motion.

8. A method of determining position of a mobile device, the method comprising:
   measuring, by a sensor, inertia of the mobile device;
   receiving, by multiple receiver antennae of the mobile device, radiofrequency (RF) signals transmitted by at least one RF transmission source
   calculating position information of the mobile device based on the RF signals received by the at least one receiver antenna to track the mobile device;
   combining the calculated position information with inertial measurement data measured by the sensor to supplement the tracking of the mobile device; and
   reducing power to the at least one receiver antenna when motion of the mobile device is not detected for a predetermined period.

9. The method of claim 8, further comprising the step of using a subsequent calculation of position information for the mobile device based on an inertial measurement as the position of the mobile device when the RF signals are weak, corrupted, or lost.

10. The method of claim 8, further comprising combining first position information calculated based on the inertial measurement with second position information calculated based on the received RF signals, including processing the first position information for the mobile device based on the inertial measurement in response to detecting a divergence between the first and second position information.

11. The method of claim 8, wherein the mobile device is an unmanned aerial vehicle.

12. The method of claim 8, further comprising the step of applying a filter to merge the position and orientation of the mobile device determined from the received RF signals with the position and orientation information into a corrected position and orientation of the mobile device.

13. The method of claim 8, further comprising the step of restoring the at least one receiver antenna to full power when motion of the mobile device is detected.

14. The method of claim 13, further comprising the step of keeping track of a last calculated corrected position and orientation of the mobile device and, when the motion of the mobile device is detected, to correct the last calculated position and orientation of the mobile device based on measurements made by the mobile device until the at least one receiver antenna returns to operation.

15. The method of claim 8, further comprising weighing RF data obtained from the RF signals based on a match with inertial data obtained from the measurements made by the sensor, the sensor including an inertial/magnetic devices subsystem (IMDS).

16. A system for tracking a position of a mobile device, the system comprising:
   a sensor attached to the mobile device, the sensor configured to determine position and orientation information of the mobile device by monitoring inertia over time;
   a radiofrequency (RF) tracking system comprising:
   at least one RF transmitter antenna on the mobile device,
   at least one RF receiver antenna; and
   at least one processor in communication with the sensor and the at least one receiver antenna, the at least one processor being configured to:

calculate position information of the mobile device based on the RF signals received by the at least one RF receiver antenna to track the mobile device;

compare the position information of the RF signals and the inertial measurement data to modify a position stability of the RF signals; and supplementing the tracking of the mobile device by combining the calculated position information with the inertial measurement data measured by the sensor; and reduce power to the at least one RF antenna when motion of the mobile device is not detected for a predetermined period.

17. The system of claim 16, wherein the at least one processor is further configured to use a subsequent calculation of position information for the mobile device based on an inertial measurement as the position of the mobile device when the RF signals are weak, corrupted, or missing.

18. The system of claim 16, wherein the at least one processor is further configured to apply a weight to the position information based on the inertial measurement in response to detecting a divergence between first and second position information of the position information.

* * * * *